US007985509B2

(12) United States Patent
Kim et al.

(10) Patent No.: US 7,985,509 B2
(45) Date of Patent: Jul. 26, 2011

(54) FUEL CELL SYSTEM

(75) Inventors: Ju-Yong Kim, Yongin-si (KR);
Hyoung-Juhn Kim, Suwon-si (KR);
Dong-Hun Lee, Yongin-si (KR);
Seong-Jin An, Yongin-si (KR);
Sung-Yong Cho, Yongin-si (KR);
Yeong-Chan Eun, Seoul (KR); Ho-Jin Kweon, Gyeonggi-do (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 0 days.

(21) Appl. No.: 12/385,510

(22) Filed: Apr. 9, 2009

(65) Prior Publication Data
US 2009/0208788 A1 Aug. 20, 2009

Related U.S. Application Data

(62) Division of application No. 11/035,887, filed on Jan. 18, 2005, now Pat. No. 7,534,512.

(30) Foreign Application Priority Data

Apr. 29, 2004 (KR) .................. 10-2004-0029961

(51) Int. Cl.
*H01M 8/04* (2006.01)
*H01M 8/06* (2006.01)
(52) U.S. Cl. ........ 429/434; 429/408; 429/423; 429/452; 429/455; 429/456
(58) Field of Classification Search .......... 429/26, 429/408, 423, 433, 434, 452, 455, 456
See application file for complete search history.

(56) References Cited

U.S. PATENT DOCUMENTS

| | | | | |
|---|---|---|---|---|
| 4,478,918 A | * | 10/1984 | Ueno et al. | 429/38 |
| 4,839,246 A | * | 6/1989 | Takabayashi | 429/12 |
| 5,041,344 A | * | 8/1991 | Kamoshita et al. | 429/26 |
| 5,366,820 A | | 11/1994 | Tsutsumi et al. | |
| 6,051,331 A | * | 4/2000 | Spear et al. | 429/34 |
| 6,131,851 A | | 10/2000 | Williams | |
| 6,413,491 B1 | * | 7/2002 | Aoyama | 423/650 |

(Continued)

FOREIGN PATENT DOCUMENTS

EP 1 535 841 6/2005

(Continued)

OTHER PUBLICATIONS

European Office Action dated Jul. 27, 2010, Application No. 05 100 558.5-1227.

*Primary Examiner* — Gregg Cantelmo
(74) *Attorney, Agent, or Firm* — Robert E. Bushnell, Esq.

(57) ABSTRACT

A fuel cell system includes a reformer for generating hydrogen gas from fuel containing hydrogen using a chemical catalytic reaction and thermal energy. At least one electricity generator generates electrical energy by an electrochemical reaction of the hydrogen gas and oxygen. A fuel supply assembly supplies fuel to the reformer, and an oxygen supply assembly supplies oxygen to the at least one electricity generator. A heat exchanger is connected to the reformer and to the at least one electricity generator. The heat exchanger supplies thermal energy of the reformer, during initial operation of the system, to the at least one electricity generator so as to pre-heat the at least one electricity generator.

6 Claims, 15 Drawing Sheets

U.S. PATENT DOCUMENTS

2002/0006535 A1   1/2002   Woods et al.

FOREIGN PATENT DOCUMENTS

| | | |
|---|---|---|
| JP | 61190865 A * | 8/1986 |
| JP | 05-343085 | 12/1993 |
| JP | 06-096788 | 4/1994 |
| JP | 08195211 A * | 7/1996 |
| JP | 10-064573 | 3/1998 |
| JP | 2000-285942 | 10/2000 |
| JP | 2000-303836 | 10/2000 |
| JP | 2002-289227 | 10/2002 |
| JP | 2003-223913 | 8/2003 |
| JP | 2004-119214 | 4/2004 |
| WO | 9605625 | 2/1996 |
| WO | WO 01/75567 | 10/2001 |
| WO | WO 03050905 A2 * | 6/2003 |
| WO | WO 03/071618 | 8/2003 |

* cited by examiner

FUEL CELL SYSTEM

CROSS-REFERENCE TO RELATED APPLICATIONS AND CLAIM OF PRIORITY

This application is a divisional of Applicant's Ser. No. 11/035,887 filed in the U.S. Patent & Trademark Office on Jan. 18, 2005, which was issued on May 19, 2009 as U.S. Pat. No. 7,534,512, and assigned to the assignee of the present invention. Furthermore, this application makes reference to, incorporates the same herein, and claims all benefits accruing under 35 U.S.C. §119 from an application for FUEL CELL SYSTEM earlier filed in the Korean Intellectual Property Office on 29 Apr. 2004 and there duly assigned Serial No. 10-2004-0029961.

BACKGROUND OF THE INVENTION

1. Technical Field

The present invention relates to a fuel cell system and, more particularly, to a fuel cell system having a structure to improve the fuel efficiency of the entire system.

2. Related Art

A fuel cell is a system for producing electric power. In a fuel cell, chemical reaction energy between oxygen and hydrogen contained in hydrocarbon-group materials, such as methanol, ethanol and natural gas, is directly converted into electric energy.

Depending on the type of electrolyte used in the fuel cell, the fuel cell is classified into different types: phosphate fuel cell, molten carbonate fuel cell, solid oxide fuel cell, and polymer electrolyte or alkali fuel cell. Although each of these different types of fuel cells operates using the same principles, the types differ in the type of fuel, catalyst, and electrolyte used, as well as in drive temperature.

A polymer electrolyte membrane fuel cell (PEMFC) has been developed recently. Compared to other fuel cells, the PEMFC has excellent output characteristics, a low operating temperature, and fast starting and response characteristics. The PEMFC may be used as a power source for vehicles, in homes and in buildings, and in electronic devices. The PEMFC, therefore, has a wide range of applications.

The basic components of the PEMFC are a stack, reformer, fuel tank, and fuel pump. The stack forms a main body of the fuel cell. The fuel pump supplies fuel in the fuel tank to the reformer. The reformer reforms the fuel to create hydrogen gas, and supplies the hydrogen gas to the stack. Accordingly, the PEMFC sends the fuel in the fuel tank to the reformer by operation of the fuel pump. The fuel is reformed in the reformer to generate hydrogen gas, and the hydrogen gas is chemically reacted with oxygen in the stack to thereby generate electric energy.

In the above fuel cell system, the stack is structured so as to include a few to a few tens of unit cells realized with a membrane electrode assembly (MEA), with separators provided on both sides thereof. In the MEA, an anode electrode and a cathode electrode are provided in opposition to one another with an electrolyte layer interposed therebetween. Further, the separator is realized using the well-known bipolar plate, and acts to separate each of the MEAs. The separator also functions to provide a pathway through which hydrogen gas and oxygen, which are required for fuel cell reaction, are supplied to the anode electrode and cathode electrode of the MEA. In addition, the separator functions as a conductor for connecting the anode electrode and cathode electrode of each MEA in series. Accordingly, hydrogen gas is supplied to the anode electrode and oxygen is supplied to the cathode electrode via the separator. An oxidation reaction of the hydrogen gas occurs in the anode electrode, and a reduction reaction of the oxygen occurs in the cathode electrode. Electricity is generated by the movement of electrons occurring during this process. Heat and moisture are also generated.

In the fuel cell system described above, the stack must be continuously maintained at a suitable temperature to ensure stability of the electrolyte layer and prevent a reduction in performance. To achieve this, the conventional fuel cell system typically includes an air-cooled cooling device to cool the stack using air that is cooler than the heat radiating from the stack. A water-cooled cooling device, in which cool water is used to reduce the heat of the stack, is also commonly used.

However, a drawback of the conventional fuel cell system utilizing such an air-cooled or water-cooled system is that the air or water heated after cooling the stack is simply discarded. This is a tremendous waste of energy.

In addition, only part of the air supplied to the cathode electrode is reacted, while the rest is exhausted as moisture and high temperature steam generated during the generation of electricity. When water is exhausted from the stack to the atmosphere of a relatively low temperature, the water contacts the atmosphere to thereby generate condensation. Therefore, the water escapes from the outer case of the electronic device, thereby imposing discomfort on the user.

Furthermore, in the conventional fuel cell system, the reformer and the stack are often pre-heated prior to first starting the system. The energy used to perform this pre-heating reduces the overall efficiency of the system.

Finally, the conventional fuel cell system uses a configuration in which hydrogen gas is generated through the reformer by separately heating and vaporizing fuel required for electricity generation of the stack. The overall efficiency of the system is again reduced by the energy used to heat the fuel in the reformer to a required temperature.

SUMMARY OF THE INVENTION

In one exemplary embodiment of the present invention, there is provided a fuel cell system having a structure in which heat and water generated during the generation of electricity is re-used as an energy source for driving the system, thereby improving the performance and efficiency of the entire system.

In an exemplary embodiment of the present invention, a fuel cell system includes: a reformer generating hydrogen gas from fuel containing hydrogen using a chemical catalytic reaction and thermal energy; at least one electricity generator generating electrical energy by an electrochemical reaction of the hydrogen gas and oxygen; a fuel supply assembly supplying fuel to the reformer; an oxygen supply assembly supplying oxygen to the electricity generator; and a first heat exchanger connected to the reformer and to the electricity generator, and supplying thermal energy of the reformer during initial operation of the system to thereby pre-heat the electricity generator.

The reformer includes a first reactor that generates thermal energy by an oxidation reaction of the fuel and oxygen. The fuel supply assembly includes a first tank storing the fuel, and a first pump connected to the first tank. The first tank and the first reactor are interconnected by a first supply line.

The oxygen supply assembly includes an air pump for performing the intake of air. The air pump and the first reactor are interconnected by a second supply line.

A plurality of electricity generators is provided, and a stack is formed by mounting the electricity generators in an adjacent configuration. Also, the stack includes pathway assemblies mounted between adjacent electricity generators, and having pathways through which thermal energy passes.

The first heat exchanger includes a nozzle member connected to one end of the pathways to thereby interconnect the first reactor and the pathways, and a recovery member connected to the other end of the pathways so as to communicate with the nozzle member. The first reactor and the nozzle member are interconnected by a third supply line.

The pathway assemblies are high temperature conductive members in the form of a plate. The high temperature conductive members are made of a conductive material selected from the group consisting of aluminum, copper and steel.

Each electricity generator includes a membrane electrode assembly and separators mounted on opposite sides of the membrane electrode assembly. The pathway assemblies form the pathways in adjacent separators.

In another aspect, a fuel cell system includes: a reformer generating hydrogen gas from fuel containing hydrogen using a chemical catalytic reaction and thermal energy; at least one electricity generator generating electrical energy by an electrochemical reaction of the hydrogen gas and oxygen; a fuel supply assembly supplying fuel to the reformer; an oxygen supply assembly supplying oxygen to the electricity generator; and a second heat exchanger circulating the fuel in the electricity generator to reduce the heat generated in the electricity generator during normal operation, and supplying the pre-heated fuel, that is heated while circulating through the electricity generator, to the reformer.

The oxygen supply assembly includes an air pump for performing the intake of air. The air pump and the electricity generator are interconnected by a fourth supply line.

A plurality of electricity generators is provided, and a stack is formed by mounting the electricity generators in an adjacent configuration. The stack includes pathway assemblies mounted between adjacent electricity generators, and having pathways through which the thermal energy passes.

The second heat exchanger includes a nozzle member connected to one end of the pathways to thereby interconnect the fuel supply assembly and the pathways, and a recovery member connected to the other end of the pathways so as to communicate with the nozzle member.

The fuel supply assembly includes a first tank storing liquid fuel containing oxygen, a second tank storing water, and a first pump connected to the first tank and the second tank, respectively. The first and second tanks and the nozzle member are interconnected by a fifth supply line.

The reformer includes a first reactor that generates thermal energy by an oxidation reaction of the fuel and oxygen, a second reactor evaporating a fuel-water mixture using thermal energy, and a third reactor generating hydrogen gas from the evaporated mixture through an evaporation reforming catalytic reaction. The recovery member and the second reactor are interconnected by a sixth supply line.

The pathway assemblies are high temperature conductive members, they include pathways, and they are interposed between adjacent electricity generators.

Each electricity generator includes a membrane electrode assembly and separators mounted on opposite sides of the membrane electrode assembly. The pathway assemblies form the pathways in adjacent separators.

The reformer further includes at least one reactor for reducing the concentration of carbon monoxide contained in the hydrogen gas.

The reformer includes a fourth reactor for performing a primary reduction of the concentration of carbon monoxide in the hydrogen gas using an aqueous gas conversion catalytic reaction, and a fifth reactor for performing a secondary reduction of the concentration of carbon monoxide in the hydrogen gas using a selective oxidation catalytic reaction. The fifth reactor and the electricity generator are interconnected by a seventh supply line.

Each of the reactors includes a plate type body, channels formed on an upper surface of the body to allow the flow of a fluid therethrough, and passage holes connected to each of the channels. The reformer has a stacked configuration realized by the combination of the bodies. The reformer includes a cover connected to an uppermost body.

The electricity generator includes a water discharge member for discharging high temperature water generated by a combination reaction of hydrogen and oxygen, and oxygen contained in the water in an unreacted state, and the electricity generator also includes a hydrogen gas discharge member discharging hydrogen gas that is unreacted with oxygen. The reformer includes a first reactor generating thermal energy by an oxidation reaction of fuel and oxygen.

The fuel cell system further includes: a third heat exchanger condensing water containing unreacted oxygen as discharged through the water discharge member to thereby respectively generate water and oxygen; and a first circulating section supplying the water generated by the third heat exchanger to the fuel supply assembly, and supplying the oxygen to the first reactor.

The third heat exchanger includes a condenser connected to the water discharge member, and an eighth supply line connected to the water discharge member and the condenser. The first circulating section includes a ninth supply line interconnecting the condenser and the fuel supply assembly, and a tenth supply line interconnecting the condenser and the first reactor.

The fuel cell system further includes a second circulating section for supplying unreacted hydrogen gas, discharged from the hydrogen gas discharge member, to the first reactor. The second circulating section includes an eleventh supply line interconnecting the hydrogen gas discharge member and the first reactor.

In yet another aspect, a fuel cell system includes: a reformer generating hydrogen gas from fuel containing hydrogen using a chemical catalytic reaction and thermal energy; at least one electricity generator generating electrical energy by an electrochemical reaction of the hydrogen gas and oxygen; a fuel supply assembly supplying fuel to the reformer; an oxygen supply assembly supplying oxygen to the electricity generator; a first heat exchanger supplying thermal energy of the reformer during initial operation of the system to thereby pre-heat the electricity generator; and a second heat exchanger circulating the fuel in the electricity generator to reduce the heat generated in the electricity generator during normal operation, and supplying the pre-heated fuel, that is heated while circulating through the electricity generator, to the reformer.

The electricity generator includes a water discharge member for discharging high temperature water generated by a combination reaction of hydrogen and oxygen, and oxygen contained in the water in an unreacted state, and the electricity generator also includes a hydrogen gas discharge member discharging hydrogen gas that is unreacted with oxygen. The reformer includes a first reactor generating thermal energy by an oxidation reaction of fuel and oxygen.

The fuel cell system further includes: a third heat exchanger condensing water containing unreacted oxygen, discharged through the water discharge member, to thereby respectively generate water and oxygen; and a first circulating section supplying the water generated by the third heat exchanger to the fuel supply assembly, and the oxygen to the first reactor.

The fuel cell system further includes a second circulating section for supplying unreacted hydrogen gas discharged from the hydrogen gas discharge member to the first reactor.

The fuel cell system further includes a fourth heat exchanger for vaporizing discharge gas discharged from the first reactor. The fourth heat exchanger includes a heater for heating the discharge gas, the heater and the first reactor being interconnected by a twelfth supply line.

The reformer includes a second reactor evaporating a fuel-water mixture using thermal energy, a third reactor generating hydrogen gas from the evaporated fuel mixture through an evaporation reforming catalytic reaction, and at least one reactor for reducing the concentration of carbon monoxide in the hydrogen gas.

The fuel cell system further includes a first auxiliary fuel supply assembly for supplying the hydrogen gas with a reduced concentration of carbon monoxide to the first reactor. The first auxiliary fuel supply assembly includes a thirteenth supply line for interconnecting a supply line that supplies hydrogen gas from the reformer to the electricity generator and a supply line that supplies unreacted hydrogen gas from the electricity generator to the first reactor.

The fuel cell system further includes a second auxiliary fuel supply assembly for additionally supplying fuel to the first reactor. The second auxiliary fuel supply assembly includes a fourteenth supply line interconnecting the fuel supply assembly and the first reactor, and a second pump connected to the fourteenth supply line.

In still yet another aspect, a fuel cell system includes: at least one electricity generator generating electrical energy by an electrochemical reaction of the hydrogen gas and oxygen; a fuel supply assembly supplying fuel to the electricity generator; an oxygen supply assembly supplying oxygen to the electricity generator; and a fifth heat exchanger circulating the fuel through an external load to thereby reduce the heat generated by the external load.

The fifth heat exchanger includes a cooling plate having a pathway and connected to a load. The fuel supply assembly and the pathway are interconnected by a fifteenth supply line.

The fuel cell system further includes a reformer generating hydrogen gas from the fuel through a chemical catalytic reaction using thermal energy, the reformer being mounted between and connected to the electricity generator and the fuel supply assembly.

The fuel cell system uses a polymer electrolyte membrane fuel cell method or a direct methanol fuel cell method.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Exemplary embodiments of the present invention will now be described in detail with reference to the accompanying drawings.

Figure 1:
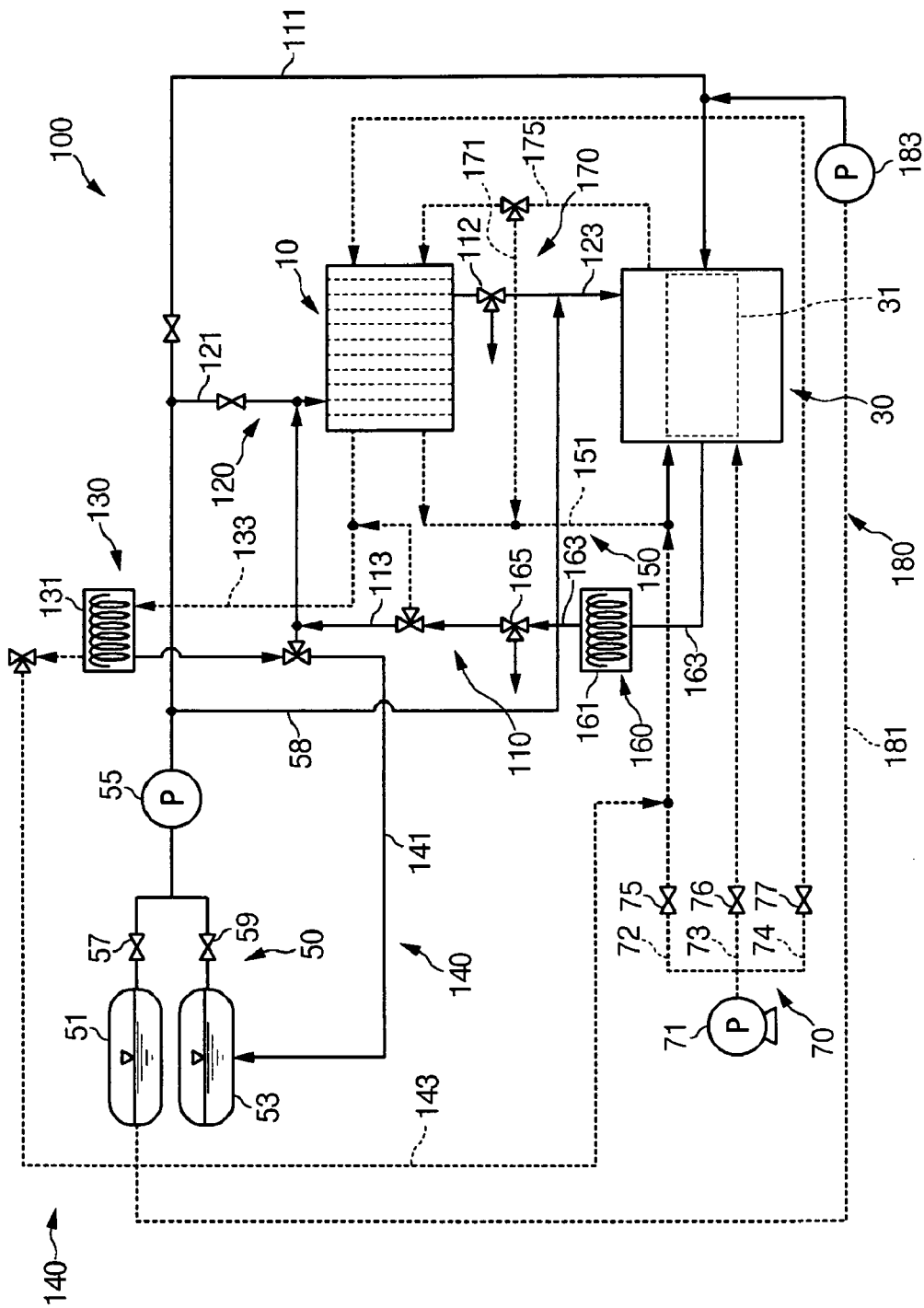
FIG. 1 is a schematic view of a fuel cell system according to an exemplary embodiment of the present invention.

FIG. 1 is a schematic view of a fuel cell system according to an exemplary embodiment of the present invention.

In the embodiment, fuel for generating electricity is taken to include fuel containing hydrogen such as methanol, ethanol, or natural gas. In the following, the fuel is used, and will be assumed to be, in liquid form, perhaps also mixed with water.

Furthermore, in a fuel cell system 100 according to an exemplary embodiment of the present invention, oxygen to react with hydrogen contained in fuel may be pure oxygen gas stored in a separate storage container, or it may simply be oxygen contained in the air. In the following, it will be assumed that oxygen contained in the air is used.

With reference to FIG. 1, the fuel cell system 100 includes a reformer 30 for generating hydrogen gas from fuel, a stack 10 for converting chemical reaction energy of the hydrogen gas and oxygen contained in air into electrical energy to thereby generate electricity, a fuel supply assembly 50 for supplying the fuel to the reformer 30, and an oxygen supply assembly 70 for supplying air to the stack 10.

In the fuel system 100 with the above basic structure, a polymer electrode membrane fuel cell (PEMFC) method is used in which hydrogen gas is generated by the reformer 30, and the hydrogen gas is supplied to the stack 10 to thereby generate electrical energy by an electrochemical reaction between oxygen and hydrogen.

The fuel supply assembly 50 includes a first tank 51 for storing liquid fuel, a second tank 53 for storing water, and a first pump 55 connected to the first tank 51 and the second tank 53. The fuel supply assembly 50 may also include a first valve 57 mounted on a line interconnecting the first tank 51 and the first pump 55, and a second valve 59 mounted on a line interconnecting the second tank 53 and the first pump 55. The first and second valves 57 and 59 are conventional 2-way valves, and selectively open and close the lines on which they are mounted using the pumping force of the first pump 55.

The oxygen supply assembly 70 includes an air pump 71 for performing the intake of air using a small pumping force.

Figure 2:
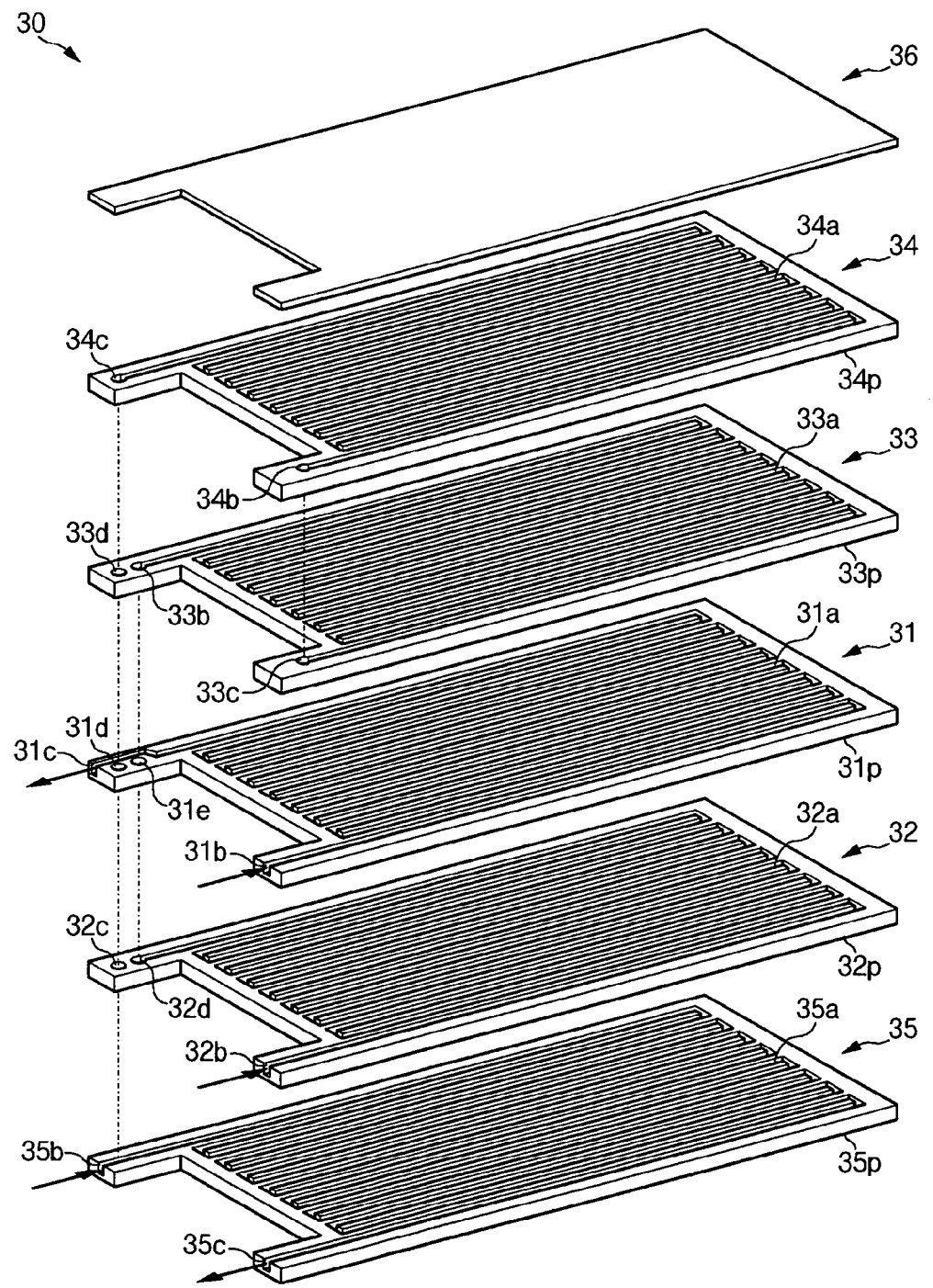
FIG. 2 is an exploded perspective view of a reformer of FIG. 1.
Figure 3:
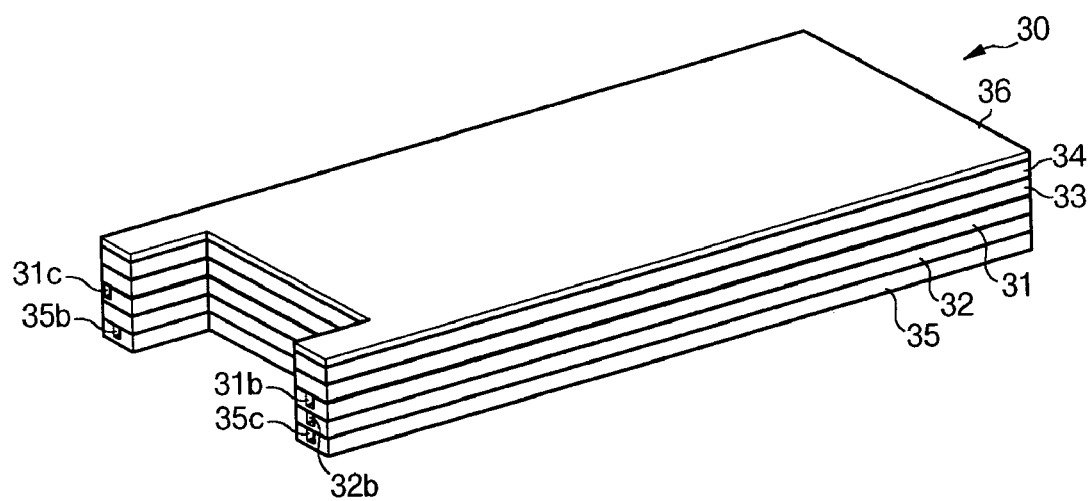
FIG. 3 is a perspective view of the reformer of FIG. 1 shown in an assembled state.

FIG. 2 is an exploded perspective view of the reformer 30, and FIG. 3 is a perspective view of the reformer 30 shown in an assembled state.

With reference to FIGS. 1-3, the reformer 30 reforms liquid fuel by a chemical catalytic reaction to generate hydrogen gas, and reduces the concentration of carbon monoxide contained in the hydrogen gas. The reformer 30 generates hydrogen gas from liquid fuel by the catalytic reaction of a steam reform, partial oxidation, or natural reaction. Further, the reformer 30 uses a catalytic reaction such as a water gas conversion method or a selective oxidation method, or a method of refining hydrogen using a separating layer, to reduce the concentration of carbon monoxide contained in the hydrogen gas.

In the exemplary embodiment, the reformer 30 includes first through fifth reactors 31-35 that are sequentially stacked, and that generate thermal energy by the oxidation reaction between the liquid fuel and the oxygen, generate hydrogen gas from the mixed fuel through the above chemical catalytic reaction using this energy, and reduce the concentration of carbon monoxide contained in the hydrogen gas.

In more detail, the reformer 30 includes: the first reactor 31 for generating reaction heat required for the chemical catalytic reaction; the second reactor 32 for vaporizing the mixed fuel using the thermal energy generated by the first reactor 31; the third reactor 33 for generating hydrogen gas from the vaporized mixed gas through a steam reformer (SR) catalytic reaction; the fourth reactor 34 for generating additional hydrogen gas through a water-gas shift (WGS) catalytic reaction, and performing primary reduction of the concentration of carbon monoxide contained in the hydrogen gas; and the fifth reactor 35 for performing secondary reduction of the carbon monoxide contained in the hydrogen gas through a preferential CO oxidation (PROX) catalytic reaction.

In the exemplary embodiment, the reformer 30 is structured such that the first reactor 31 is positioned in the center, the third reactor 33 and the fourth reactor 34 are sequentially stacked on one side of the first reactor 31, and the second reactor 32 and the fifth reactor 35 are sequentially stacked on the other side of the first reactor 31. Formed on an upper side (in FIGS. 2 and 3) of each of the first through fifth reactors 31-35 are flow channels 31a-35a and passage holes 31d, 31e, 32c, 32d, 33b-33d, 34b and 34c to allow the flow of fluid. Further, a cover 36 may be mounted on a side of the fourth reactor 34 remote from the third reactor 33. The first through fifth reactors 31-35 may be in the form of quadrilateral plates having a predetermined length and width, and may be formed of a metal having thermal conductivity, such as aluminum, copper and steel.

The first reactor 31 is a heating element that generates thermal energy required for the generation of hydrogen gas, and pre-heats the entire reformer 30. The first reactor 31 performs combustion by an oxidation catalytic reaction between the liquid fuel and air.

The first reactor 31 includes a first body 31p in the form of a quadrilateral plate. A first flow channel 31a is formed in the first body 31p to enable the fluid flow of fuel and air. The first flow channel 31a has a start end and a finish end, and is formed on a side of the first body 31p adjacent to the second reactor 33. Further, a catalyst layer (not shown) is formed in the first flow channel 31a for performing a catalyst operation with respect to the oxidation reaction of fuel and air.

Further, a first intake hole 31b is formed in the first body 31p of the first reactor 31, through which intake hole 31b liquid fuel and air are supplied to the first flow channel 31a. A first exhaust hole 31c is also formed in the first body 31p of the first reactor 31, through which exhaust hole 31c combusted gas that undergoes oxidation and burning while passing through the first flow channel 31a is exhausted. The first intake hole 31b is connected to the start end of the first flow channel 31a, and the first exhaust hole 31c is connected to the finish end of the first flow channel 31a. Further, a first passage hole 31d and a second passage hole 31e are formed in the area of the first exhaust hole 31c. The first intake hole 31b is connected to the first tank 51 of the fuel supply assembly 50 through a first supply line 111, and to the air pump 71 of the oxygen supply assembly 70 through a second supply line 72. A third valve 75 is mounted on the second supply line 72.

The second reactor 32 receives the supply of mixed fuel for generating oxygen gas. The second reactor 32 receives thermal energy from the first reactor 31 to vaporize the mixed gas.

The second reactor 32 includes a second body 32p in the form of a quadrilateral plate. A second flow channel 32a is formed in the second body 32p to enable the flow of mixed fuel. The second flow channel 32a has a start end and a finish end, and is formed on a side of the second body 32p adjacent to the first reactor 31. A catalyst layer (not shown) is formed in the second flow channel 32a for accelerating the vaporization of mixed fuel.

Further, a second intake hole 32b is formed in the second body 32p of the second reactor 32, through which intake hole 32b mixed fuel is supplied to the second flow channel 532a. The second intake hole 32b is connected to the start end of the second flow channel 32a. Further, a third passage hole 32c communicating with the first passage hole 31d of the first reactor 31 is formed in the second body 32p, and a fourth passage hole 32d communicating with the second passage hole 31e of first reactor 31, and connected to the finish end of the second flow channel 32a, is formed in the second body 32p.

As described above, the third reactor 33 generates hydrogen gas from the vaporized mixed gas through an SR catalytic reaction. The third reactor 33 includes a third body 33p in the form of a quadrilateral plate. A third flow channel 33a is formed in the third body 33p to enable the flow of mixed fuel. The third flow channel 33a has a start end and a finish end, and is formed on a side of the third body 33p adjacent to the fourth reactor 34. Further, a catalyst layer (not shown) is formed in the third flow channel 33a for accelerating a reform reaction operation performed on vaporized mixed fuel.

In order to enable the reception of vaporized mixed fuel from the second reactor 32, there are formed, in the third body 33p of the third reactor 33, a fifth passage hole 33b communicating with the second passage hole 31e of the first reactor 31, a sixth passage hole 33c connected to the finish end of the third flow channel 33a, and a seventh passage hole 33d communicating with the first passage hole 31d of the first reactor 31.

As described above, the fourth reactor 34 generates hydrogen gas (in addition to that generated in the third reactor 33) through a WGS catalytic reaction, and performs primary reduction of the concentration of carbon monoxide contained in the hydrogen gas.

The fourth reactor 34 includes a fourth body 34p in the form of a quadrilateral plate. A fourth flow channel 34a is formed in the fourth body 34p to enable the flow of hydrogen gas. The fourth flow channel 34a has a start end and a finish end, and is formed on a side of the fourth body 34p adjacent to the cover 36. Further, a catalyst layer (not shown) is formed in the fourth flow channel 34a for accelerating a conversion reaction of hydrogen gas.

Further, there are formed, in the fourth body 34p of the fourth reactor 34, an eighth passage hole 34b communicating with the sixth passage hole 33c of the third reactor 33, and a ninth passage hole 34c connected to the finish end of the fourth flow channel 34a and communicating with the seventh passage hole 33d of the third reactor 33.

The fifth reactor 35 performs a secondary reduction of the concentration of carbon monoxide contained in the hydrogen gas through a selective PROX catalytic reaction of air and hydrogen gas generated in the fourth reactor 34.

The fifth reactor 35 includes a fifth body 35p in the form of a quadrilateral plate. A fifth flow channel 35a is formed in the fifth body 35p to enable the flow of hydrogen gas generated in the fourth reactor 34. The fifth flow channel 35a has a start end and a finish end, and is formed on a side of the fifth body 35p adjacent to the second reactor 32. A catalyst layer (not shown) is formed in the fifth flow channel 35a for accelerating the above selective oxidation reaction.

Further, there are formed, in the fifth body 35p of the fifth reactor 35, a third intake hole 35b for supplying air to the fifth flow channel 35a, and a second exhaust hole 35c for supplying finally generated hydrogen gas to the stack 10. The third intake hole 35b is connected to the start end of the fifth flow channel 35a, and the second exhaust hole 35c is connected to the finish end of the fifth flow channel 35a. The third intake hole 35b is connected to the air pump 71 of the oxygen supply assembly 70 through a seventh supply line 73. A fourth valve 76 is mounted on the seventh supply line 73. Further, the second exhaust hole 35c is connected to the stack 10 through a hydrogen gas supply passage 175.

The formation of the first through fifth bodies 31p-35p of the first through fifth reactors 31-35, respectively, as quadrilateral plates is one example of how these elements may be shaped. Other configurations that allow stacking of the first through fifth bodies 31p-35p may also be used.

Figure 4:
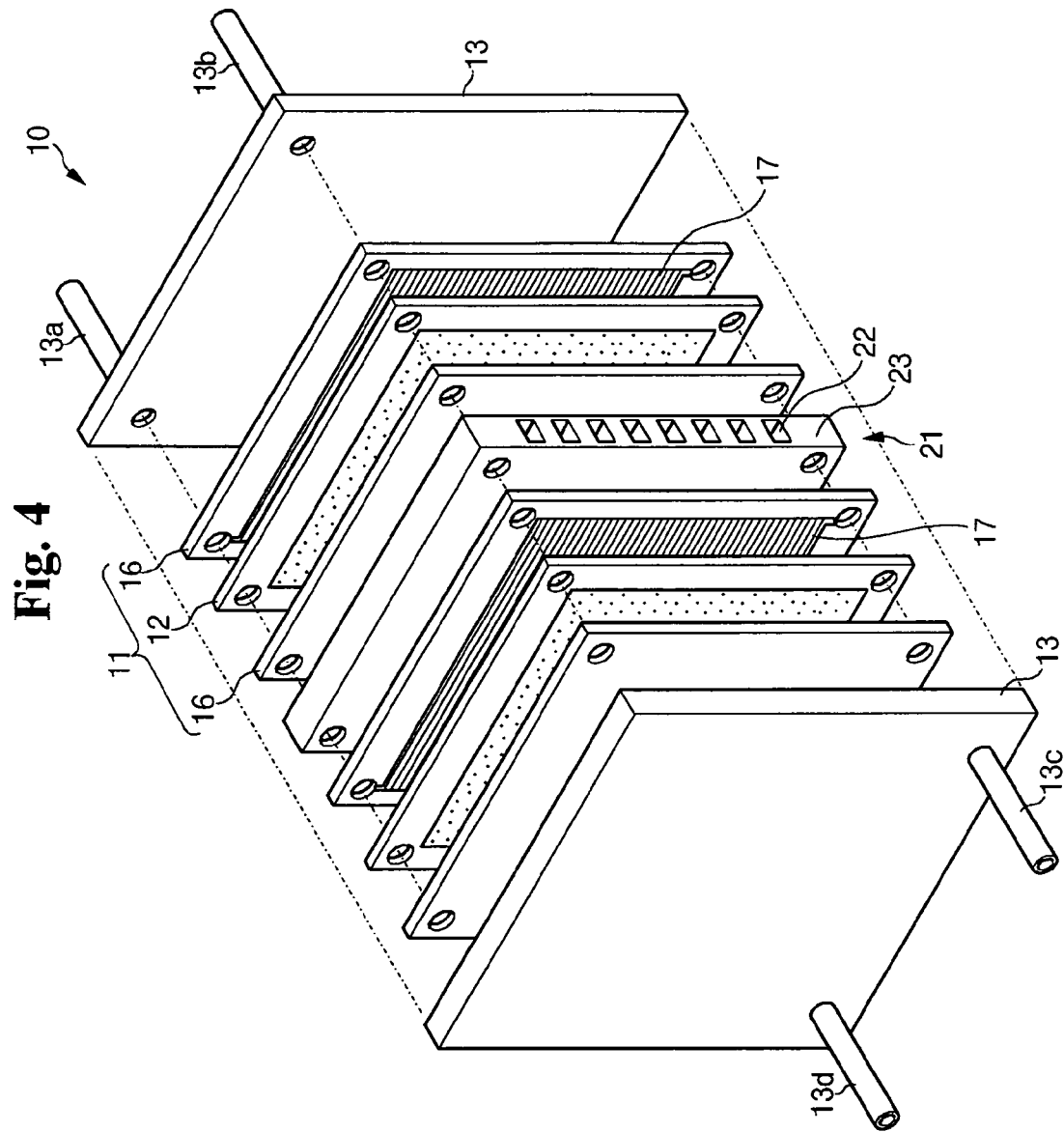
FIG. 4 is an exploded perspective view of a stack of FIG. 1.

FIG. 4 is an exploded perspective view of the stack 10.

With reference to FIGS. 1 and 4, the stack 10 includes at least one electricity generator 11 for generating electrical energy through an oxidation/reduction reaction of hydrogen gas generated by the reformer 30 with oxygen contained in the air. Each of the electricity generators 11 (in the case where there is more than one) forms a minimum unit cell for generating electricity by interposing a membrane electrode assembly (MEA) 12 between two separators 16. A plurality of such unit cells are combined to form the stack 10 of the exemplary embodiment having a stacked configuration. Pressing plates 13 are mounted to opposite outermost layers of the plurality of the electricity generators 11. However, in the present invention, the separators 16 positioned in the outermost opposing layers may be used in place of the pressing plates 13, in which case the pressing plates 13 are not included in the configuration. When the pressing plates 13 are used, they may have a function in addition to that of pressing together the plurality of electricity generators 11. That is, as explained in the following, the pressing plates 13 may act such that the separators 16 are made to have a particular function.

An anode electrode and a cathode electrode are mounted to opposite surfaces of each of the MEAs 12, and an electrolyte layer is positioned between the anode electrode and cathode electrode. The anode electrode effects an oxidation reaction of hydrogen gas, and converted electrons are attracted outwardly so that current is generated by the flow of electrons, which moves hydrogen ions to the cathode electrode through the electrolyte layer. The cathode electrode effects a conversion reaction of the hydrogen ions, electrons, and oxygen to realize the conversion into water. Further, the electrolyte layer moves the hydrogen ions generated in the anode electrode to the cathode electrode.

Each of the separators 16 acts as a path through which hydrogen gas and air needed for the oxidation/reduction reaction of the MEAs 12 are supplied to the anode electrode and the cathode electrode. Each of the separators 16 also functions as a conductor for connecting in series the corresponding anode electrode and the cathode electrode. In more detail, each of the separators 16 provides a flow channel 17 to form a path on a surface closely contacting the anode electrode of the corresponding MEA 12 for the supply of hydrogen gas to the anode electrode, and a path on a surface closely contacting the cathode electrode of the corresponding MEA 12 for the supply of air to the cathode electrode.

The pressing plates 13 include a first infusion member 13a for supplying hydrogen gas to the hydrogen path of the corresponding separator 16, a second infusion member 13b for supplying air to the air path of the corresponding separator 16, a first discharge member 13c for exhausting hydrogen gas remaining after reaction in the anode electrode of the corresponding MEA 12, and a second discharge member 13d for exhausting air remaining after reaction of water and hydrogen generated by a combination reaction of hydrogen and oxygen in the cathode electrode of the corresponding MEA 12.

The first infusion member 13a may be connected through the hydrogen gas supply passage 175. The second infusion member 13b may be connected through a fourth supply line 74 to the air pump 71 of the oxygen supply assembly 70. A fifth valve 77 is mounted on the fourth supply line 74.

The stack 10 having the above structure also includes a pathway assembly 21 having at least one pathway 22. The pathway assembly 21 is positioned between adjacent electricity generators 11. In one embodiment, the pathway assembly 21 includes a high temperature conductive member 23 in the form of a plate positioned between groups of two or three of the electricity generators 11. The high temperature conductive member 23 is made of a heat conducting metal material to enable easy transmission of heat generated in the electricity generators 11. Examples of the metal material include aluminum, copper, and steel.

Figure 5:
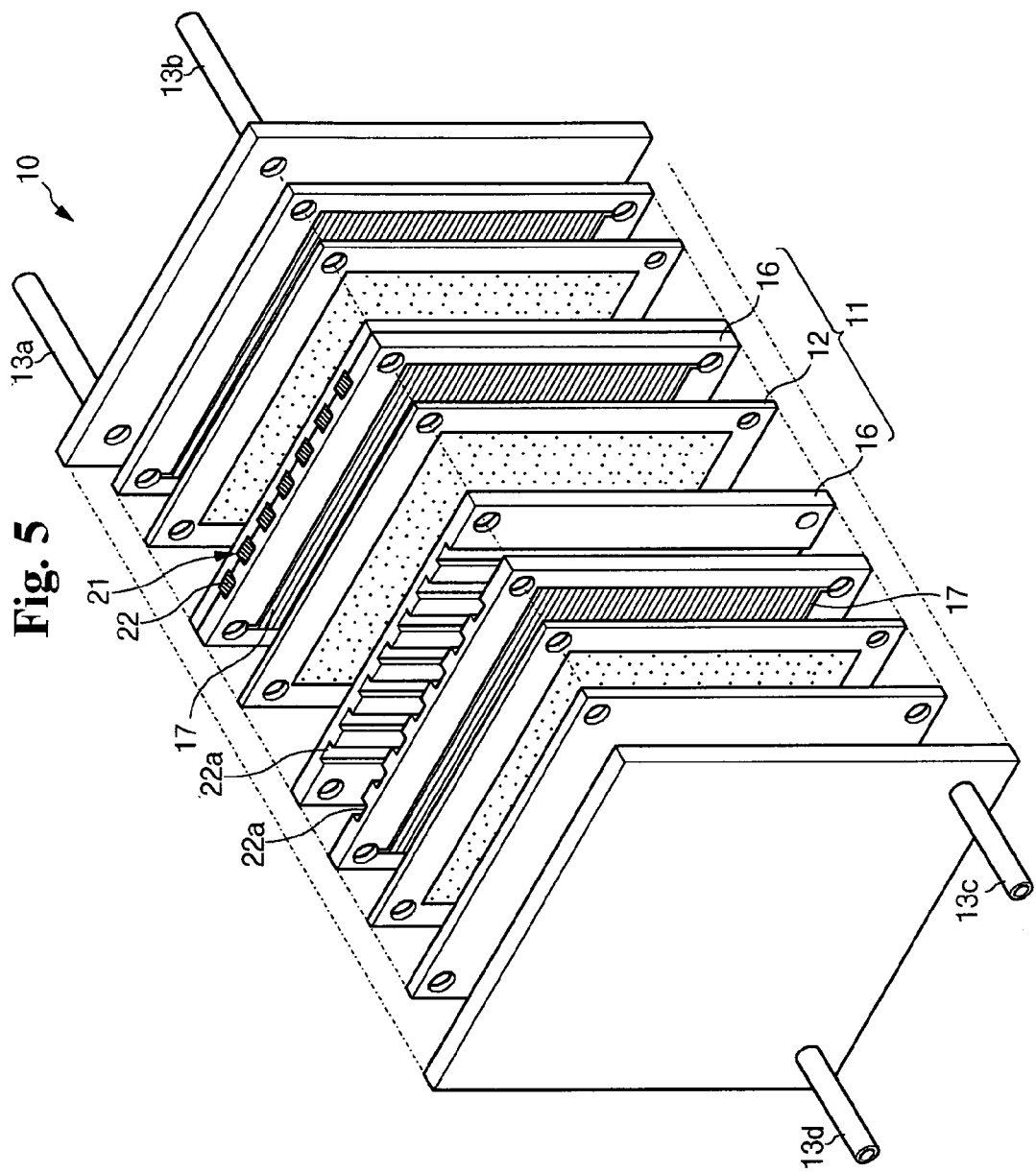
FIG. 5 is an exploded perspective view of a stack according to a modified example of the present invention.

FIG. 5 is an exploded perspective view of a stack according to a modified example of the present invention.

With reference to FIG. 5, in the stack according to a modified example of the present invention, the pathway assemblies 21 having at least one pathway 22 are formed in the separators 16 of the electricity generators 11. Each of the pathway assemblies 21 includes grooves 22a formed in adjacent separators 16. When the adjacent separators 16 are closely contacted, the grooves 22a combine to thereby form the pathways 22.

In the fuel cell system 100 (FIG. 1) of the present invention, thermal energy generated in the reformer 30 is supplied to the electricity generators 11 (FIGS. 4 and 5) of the stack 10 to improve performance and heat efficiency. A first heat exchanger 110 (FIG. 1) for performing this operation, so that the electricity generators 11 are pre-heated, is included in the fuel cell system 100.

Figure 6:
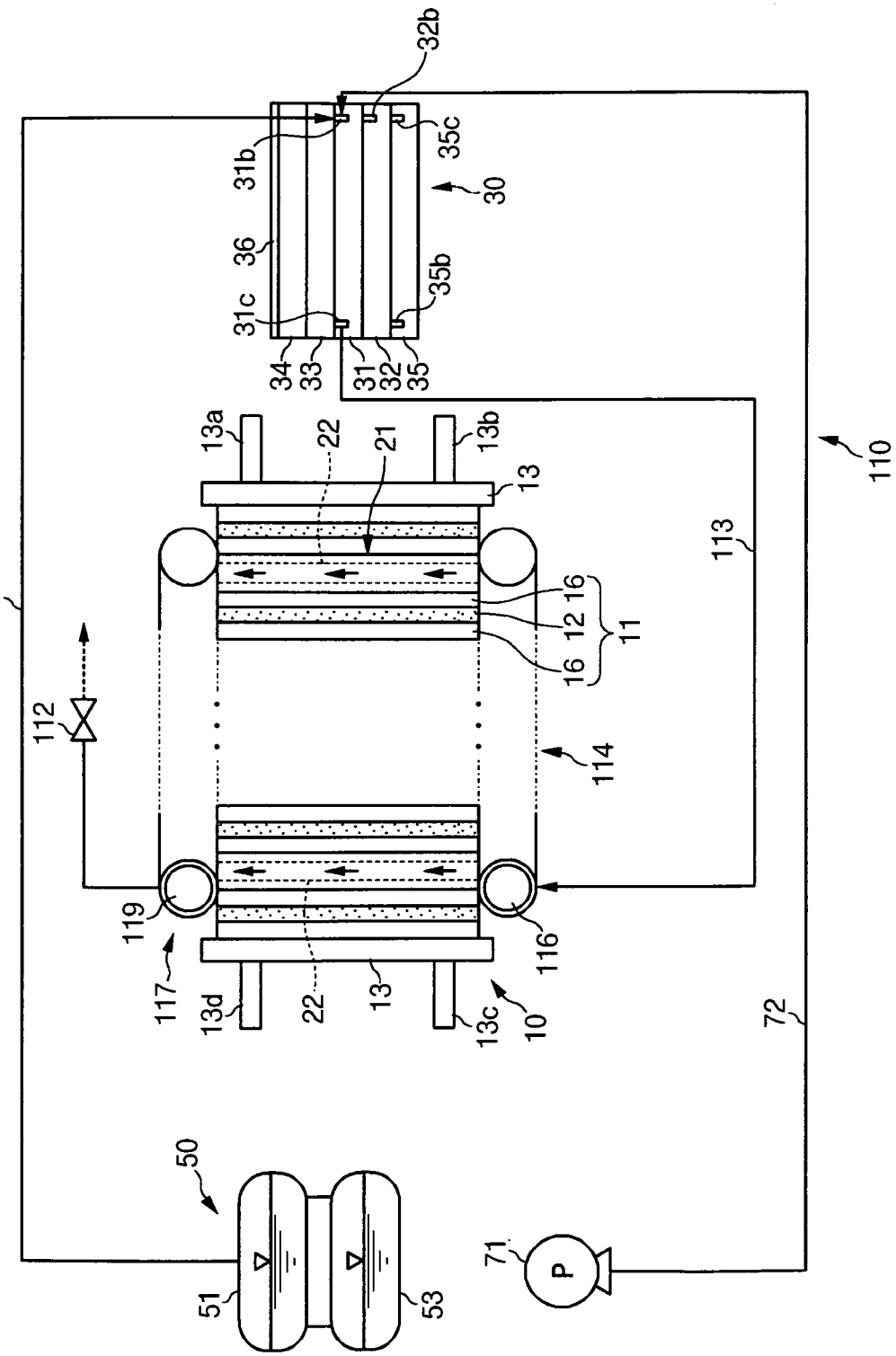
FIG. 6 is a schematic view of a first heat exchanger of FIG. 1 and related elements.

FIG. 6 is a schematic view of the first heat exchanger 110.

With reference to FIGS. 1, 2 and 4 thru 6, the first heat exchanger 110 has a structure to supply liquid fuel and air to the first reactor 31 of the reformer 30 such that thermal energy 13 created by an oxidation reaction is provided to the electricity generators 11 of stack 10. That is, the first heat exchanger 110 supplies exhaust gas of a relatively high temperature discharged is from the first reactor 31 to the electricity generators 11 to thereby pre-heat the electricity generators 11.

The first heat exchanger 110 is connected to the first tank 51 and the first intake hole 31b of the first reactor 31 through the first supply line 111, and to the air pump 71 and the first intake hole 31b through the second supply line 72.

The first heat exchanger 110 includes a nozzle member 114 for spraying exhaust gas emitted from the first reactor 31 to the electricity generators 11, and a recovery member 117 for recovering exhaust gas after it passes through the electricity generators 11.

Figure 7:
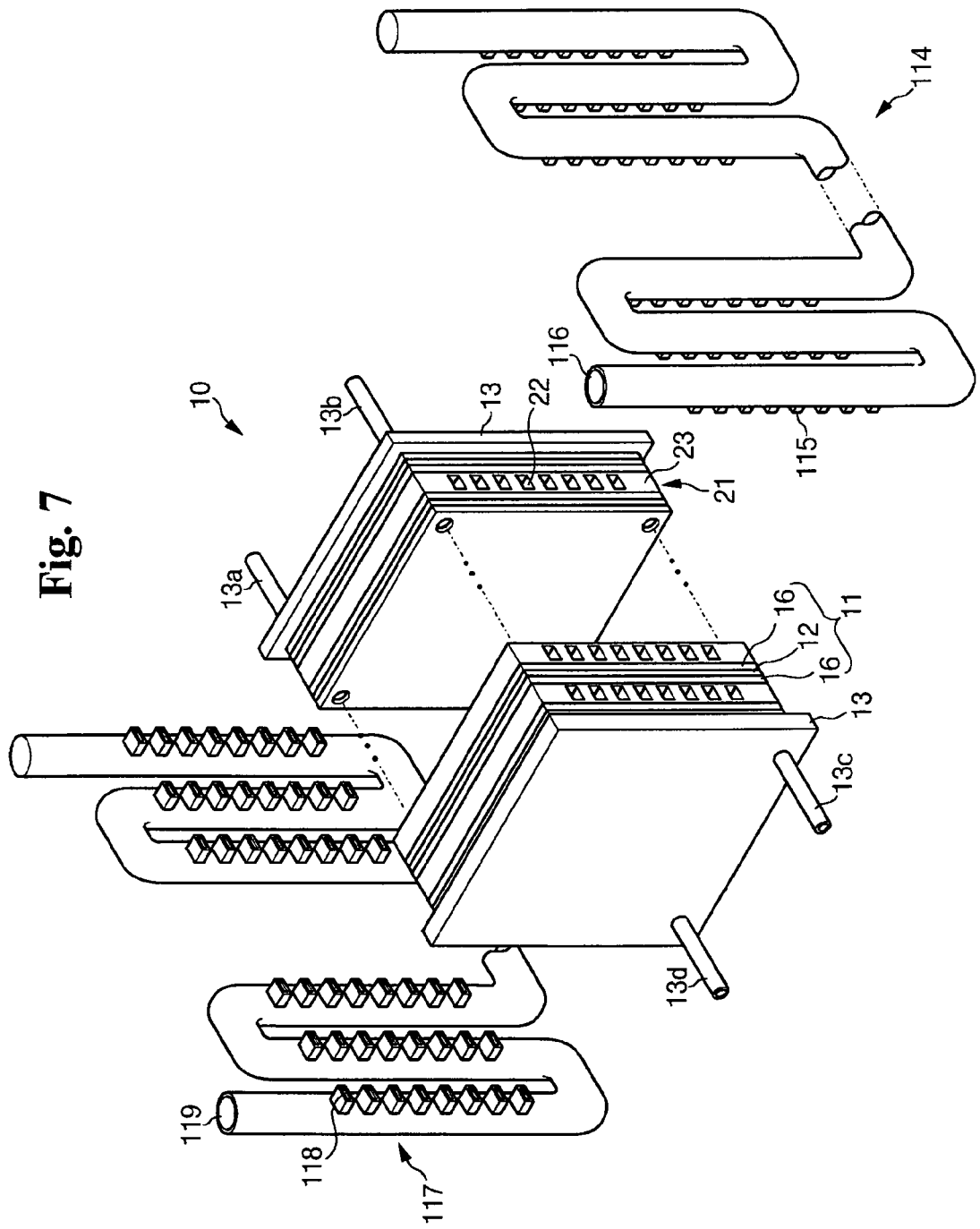
FIG. 7 is an exploded perspective view of a nozzle member and a recovery member of FIG. 6.

FIG. 7 is an exploded perspective view of the nozzle member 114 and the recovery member 117 of FIG. 6.

With reference to FIGS. 4 thru 7, the nozzle member 114 supplies the exhaust gas emitted from the first reactor 31 to the pathway assemblies 21 of the stack 10 to thereby pre-heat the electricity generators 11 closely contacting the pathway assemblies 21. The nozzle member 114 is connected to the pathways 22 of the pathway assemblies 21. The nozzle member 114 includes a plurality of nozzle holes 115 communicating with the pathways 22, and is in the form of a pipe having one end open and an opposite end closed. The nozzle holes 115 protrude from the nozzle member 114 to enable insertion into the pathways 22 in a closely contacting manner. The end of the nozzle member 114 that is open is an entrance 116 through which the exhaust gas is supplied. The entrance 116 is connected to the first exhaust hole 31c of the first reactor 31.

The recovery member 117 collects the exhaust gas that passes through the pathway assemblies 21 by operation of the nozzle member 114, and either discharges the exhaust gas to the exterior of system 100 or supplies the exhaust gas to the first reactor 31. The recovery member 117 is connected to the pathways 22 of the pathway assemblies 21. The recovery member 117 includes a plurality of recovery holes 118 communicating with the pathways 22, and is in the form of a pipe having one end open and an opposite end closed. The recovery holes 118 protrude from the recovery member 117 to enable insertion into the pathways 22 in a closely contacting manner at an end opposite that into which the nozzle holes 115 are inserted. The end of the recovery member 117 that is open is an exit 119 through which the exhaust gas is exhausted. The exit 119 is connected to a sixth valve 112 shown in FIG. 1.

The fuel cell system 100 of the present invention having the above structure realizes normal operation in a state where the electricity generators 11 are pre-heated through the first heat exchanger 110. Electrical energy is generated through the electrochemical reaction between hydrogen gas and oxygen in air in the electricity generators 11. Heat is additionally created by the chemical reaction between hydrogen gas and oxygen in the electricity generators 11.

In the exemplary embodiment of the present invention, a mixture of liquid fuel and water is circulated within the stack 10 to thereby reduce the heat generated in the electricity generators 11. A second heat exchanger 120 is provided to supply, to the reformer 30, the mixed fuel that is heated while cooling the stack 10.

Figure 8:
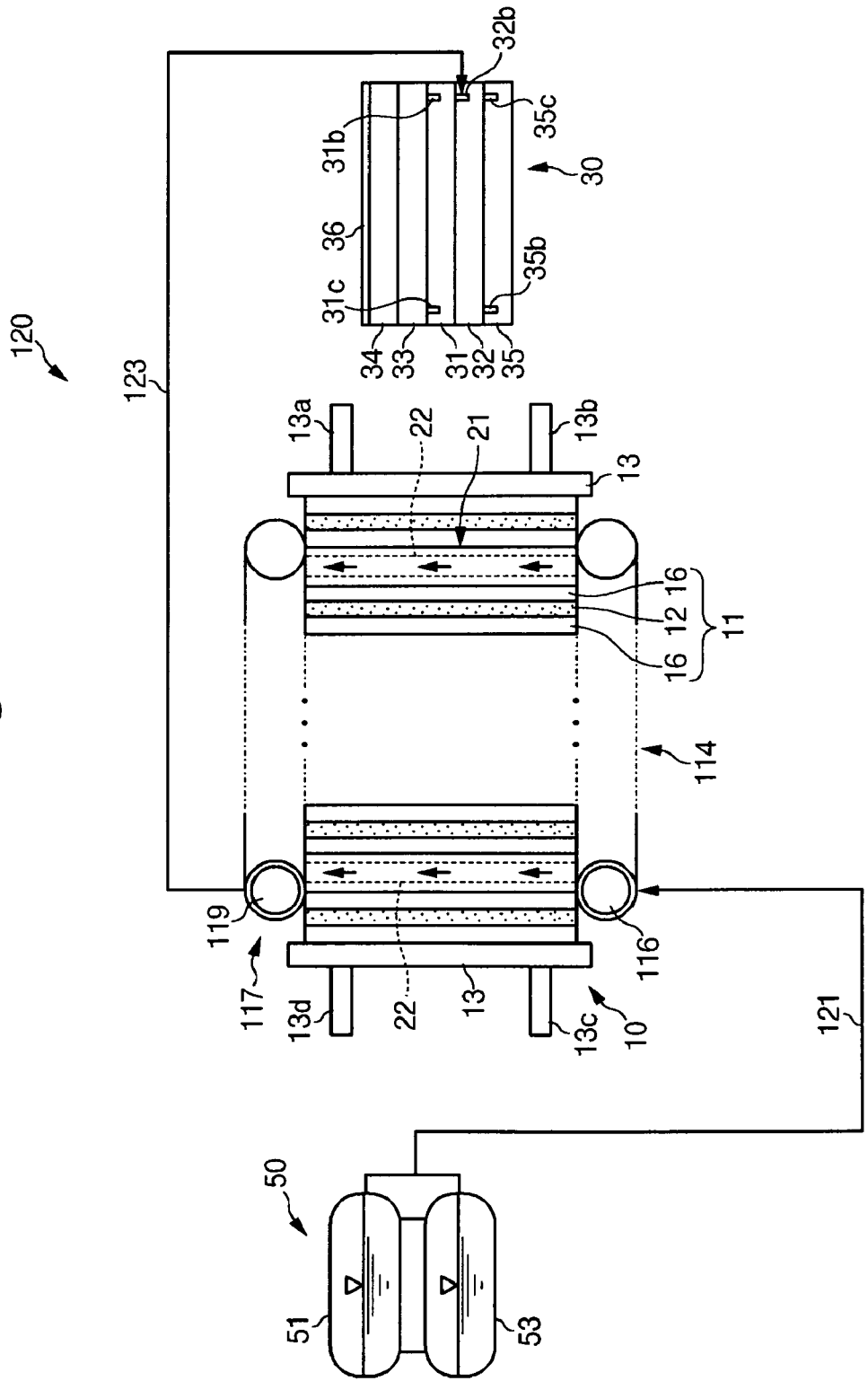
FIG. 8 is a schematic view of a second heat exchanger of FIG. 1 and related elements.

FIG. 8 is a schematic view of the second heat exchanger 120 and related elements.

With reference to FIGS. 1 and 8, the second heat exchanger 120 connects the fuel supply assembly 50 and the pathway assemblies 21 of the stack 10 through a fifth supply line 121, and connects the pathway assemblies 21 and the second reactor 32 of the reformer 30 through a sixth supply line 123.

The second heat exchanger 120 includes a nozzle member 114 that sprays a mixture of liquid fuel emitted from the first tank 51 and water emitted from the second tank 53 to the electricity generators 11, and a recovery member 117 for recovering the mixture after passing through the electricity generators 11 and supplying the same to the second reactor 32.

With reference to FIGS. 6 and 7, the nozzle member 114 supplies the exhaust gas to the pathway assemblies 21 of the stack 10 to reduce the heat generated in the electricity generators 11. The nozzle member 114 is connected to the pathways 22 of the pathway assemblies 21. The nozzle member 114 includes a plurality of nozzle holes 115 communicating with the pathways 22, and is in the form of a pipe having one end open and an opposite end closed. The nozzle holes 115 protrude from the nozzle member 114 to enable insertion into the pathways 22 in a closely contacting manner. The end of the nozzle member 114 that is open is an entrance 116 through which the fuel mixture is supplied. The entrance 116 is connected to the first tank 51 and second tank 53 through the fifth supply line 121.

The recovery member 117 collects the mixed gas that passes through the pathway assemblies 21 by operation of the nozzle member 114, and supplies the mixed gas to the second reactor 32. The recovery member 117 is connected to the pathways 22 of the pathway assemblies 21. The recovery member 117 includes a plurality of recovery holes 118 communicating with the pathways 22, and is in the form of a pipe having one end open and an opposite end closed. The recovery holes 118 protrude from the recovery member 117 to enable insertion into the pathways 22 in a closely contacting manner at an end opposite that into which the nozzle holes 115 are inserted. The end of the recovery member 117 that is open is an exit 119 through which the mixed gas is supplied to the second reactor 32 of the reformer 30. The exit 119 is connected to the second intake hole 32b of the second reactor 32 through the sixth supply line 123.

During operation of the fuel cell system 100 of the present invention having the above structure, high temperature moisture generated by a contact reaction between oxygen and hydrogen of the electricity generators 11, and air containing moisture that has not reacted with hydrogen, are exhausted from the second discharge member 13d of the stack 10.

In the exemplary embodiment of the present invention, a third heat exchanger 130 is included to condense moisture emitted in a state mixed with unreacted air through the second discharge member 13d of the stack 10, and generates water and air in a separated state.

Figure 9:
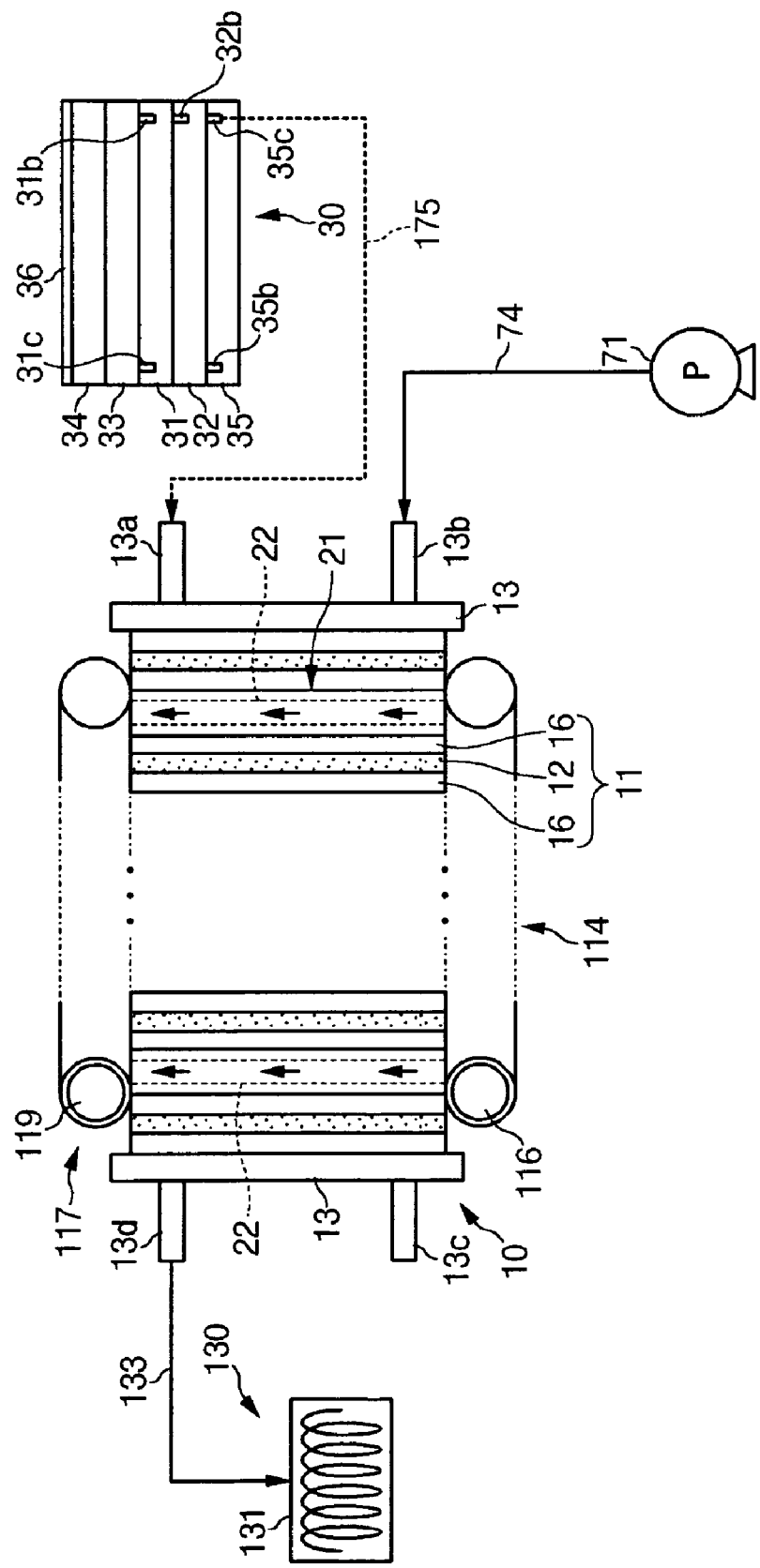
FIG. 9 is a schematic view of a third heat exchanger of FIG. 1 and related elements.

FIG. 9 is a schematic view of the third heat exchanger 130 and related elements.

With reference to FIGS. 1 and 9, the third heat exchanger 130 includes a condenser 131 for performing condensing of water. The second discharge member 13d and the condenser 13 are connected by an eighth supply line 133. The condenser 131 condenses high temperature moisture containing unreacted air to thereby generate water and air. Water and air generated by the condenser 131 is supplied to the fuel supply assembly 50 and the reformer 30, respectively, through the first circulating section 140.

Figure 10:
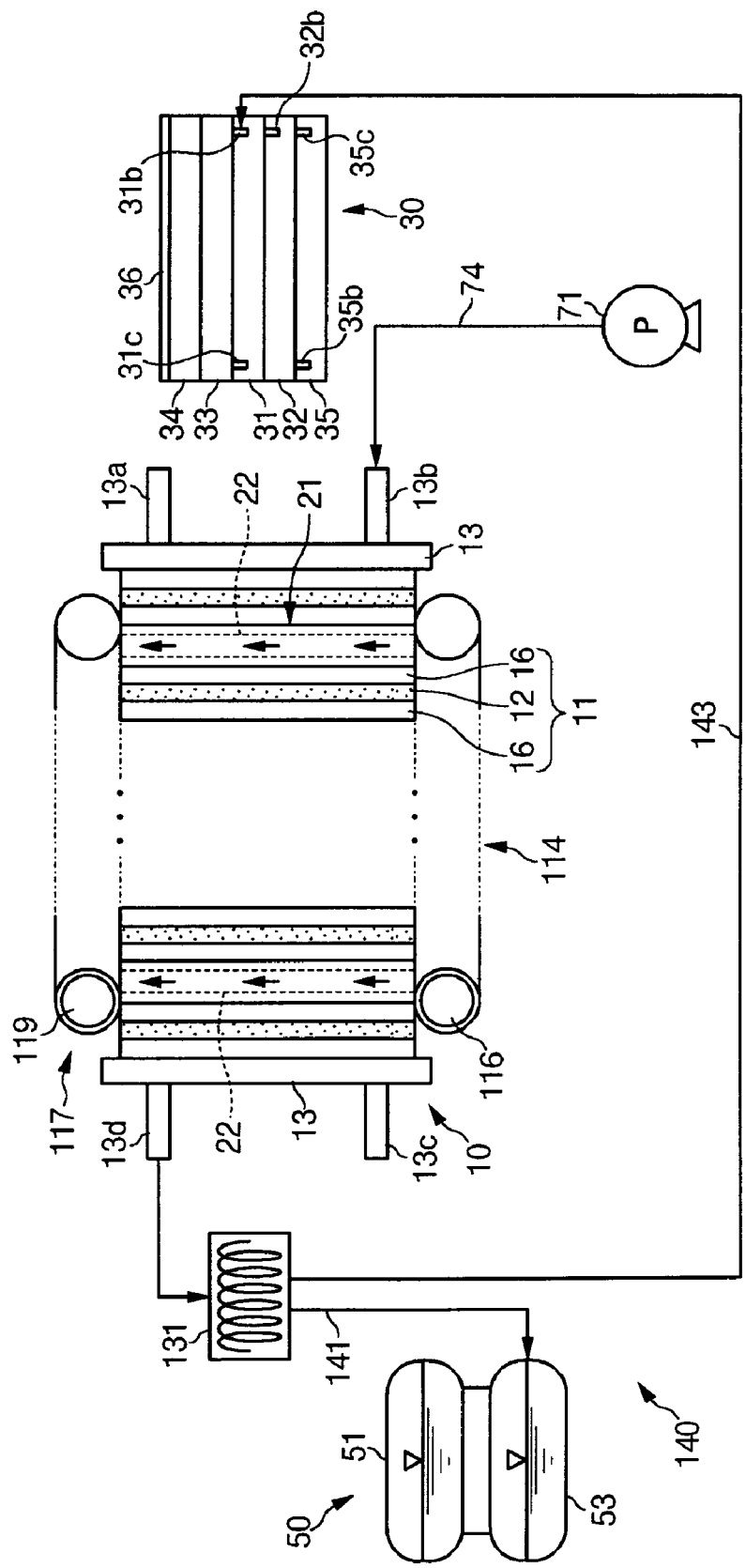
FIG. 10 is a schematic view of a first circulating section of FIG. 1 and related elements.

FIG. 10 is a schematic view of the first circulating section 140 and related elements.

Referring to FIGS. 1 and 10, the first circulating section 140 includes a ninth supply line 141 that interconnects the condenser 131 and the second tank 53 of the fuel supply assembly 50 for supply of water to the second tank 53. The first circulating section 140 also 7 includes a tenth supply line 143 that interconnects the condenser 131 and the first intake hole 31b of the first reactor 31 for supplying air to the first reactor 31 of the reformer 30.

During operation of the fuel cell system 100 of the present invention having the above structure, hydrogen gas remaining after reaction in the electricity generators 11 is discharged from the first discharge member 13c of the stack 10.

In the exemplary embodiment of the present invention, a second circulating section 150 is included to supply unreacted hydrogen gas to the first reactor 31 of the reformer 30.

Figure 11:
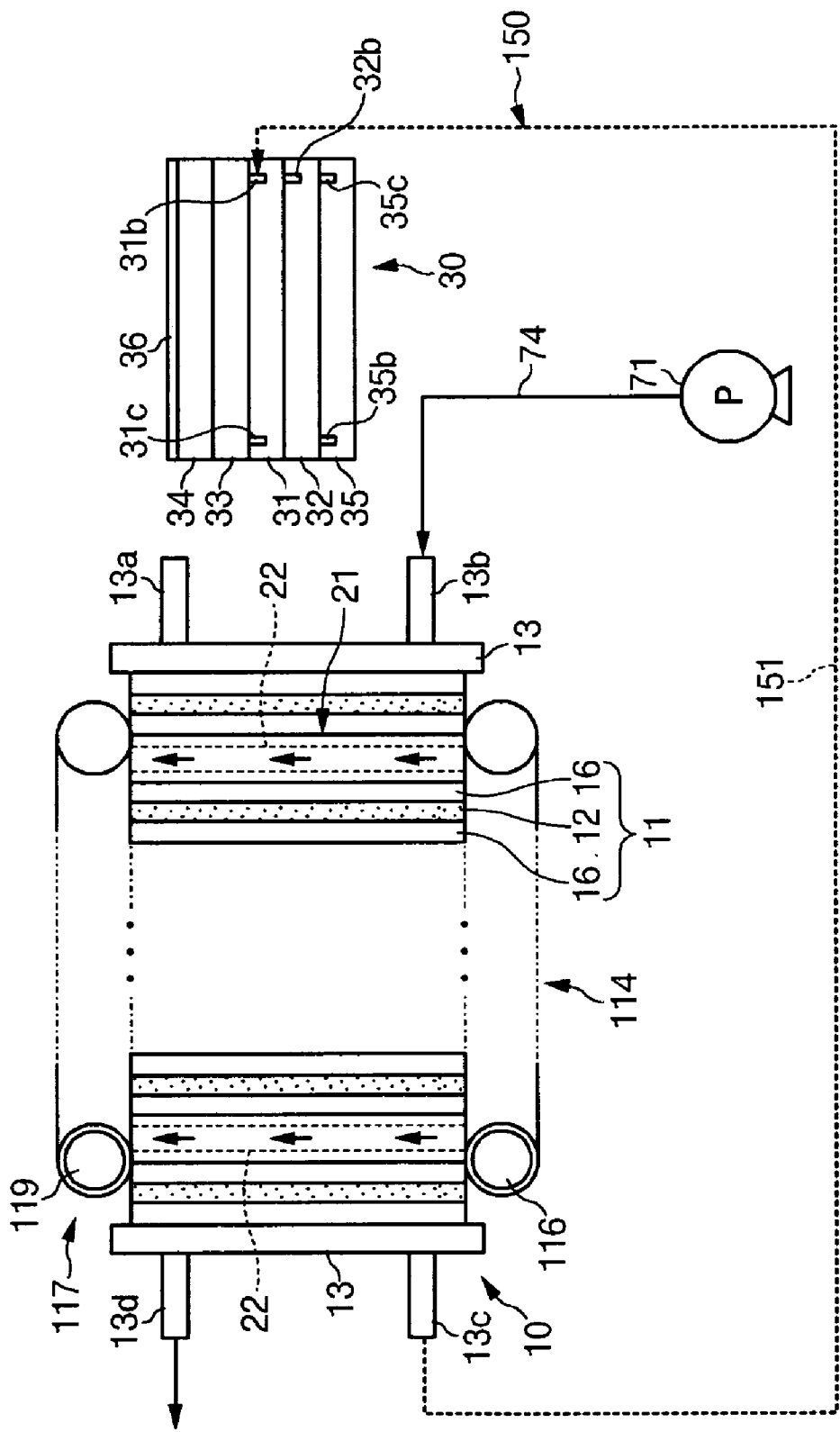
FIG. 11 is a schematic view of a second circulating section of FIG. 1 and related elements.

FIG. 11 is a schematic view of the second circulating section 150 and related elements.

Referring to FIGS. 1 and 11, the second circulating section 150 includes an eleventh supply line 151 that interconnects the first discharge member 13c of the stack 10 and the first intake hole 31b of the first reactor 31.

During operation of the fuel cell system 100 of the present invention having the above structure, part of the unreacted hydrogen gas re-supplied to the first reactor 31 of the reformer 30 by the second circulating section 150 is reacted, and the rest of the hydrogen gas is discharged in an unreacted state.

In the exemplary embodiment of the present invention, there is included a fourth heat exchanger 160 for heating the discharge gas and discharging the same externally.

Figure 12:
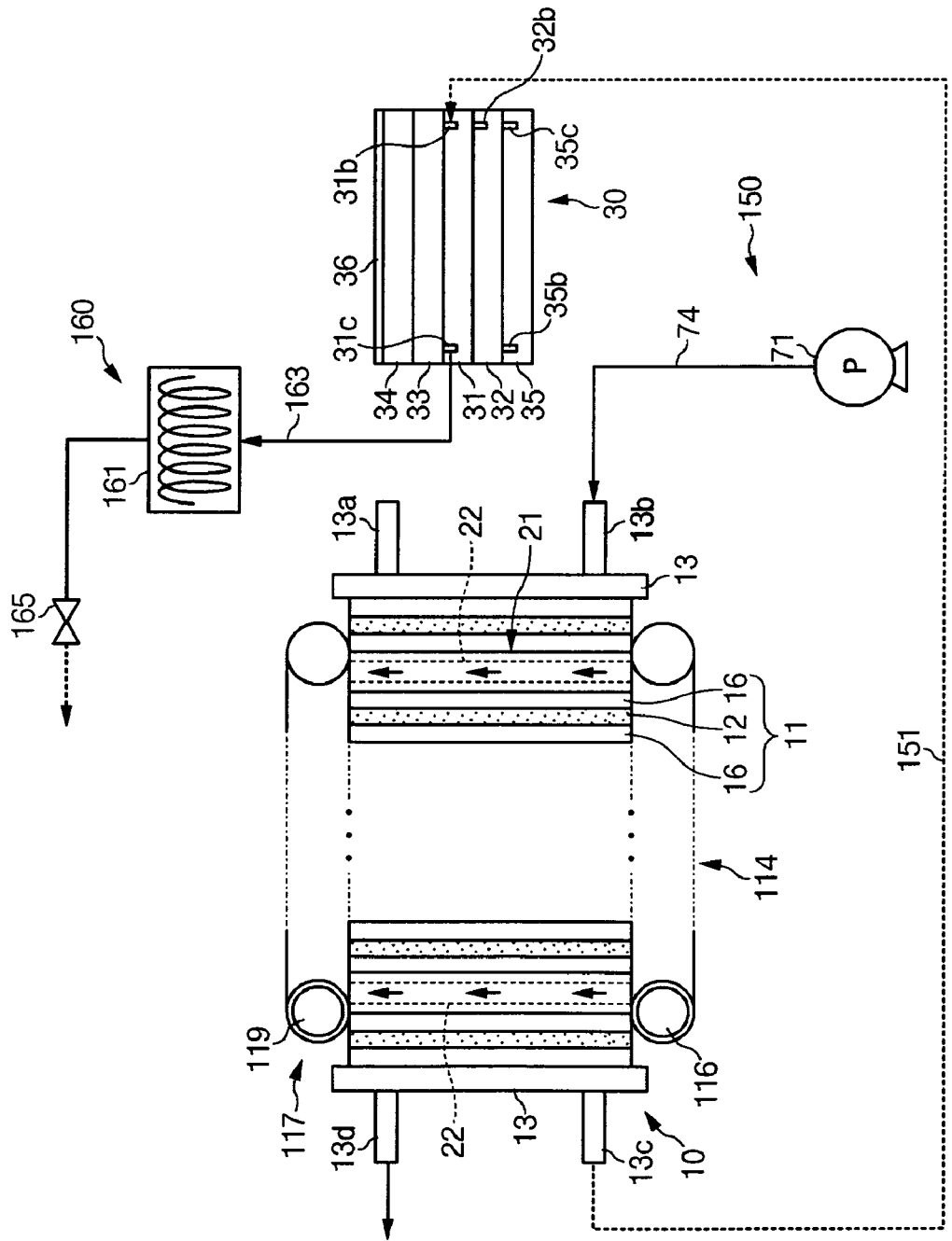
FIG. 12 is a schematic view of a fourth heat exchanger of FIG. 1 and related elements.

FIG. 12 is a schematic view of the fourth heat exchanger 160 and related elements.

With reference to FIGS. 1 and 12, the fourth heat exchanger 160 includes a heater 161 for heating the discharge gas. The heater 161 and the first exhaust hole 31c of the first reactor 31 are interconnected by a twelfth supply line 163. The heater 161 is also connected to a seventh valve 165.

The fuel cell system 100 of the present invention includes first and second auxiliary fuel supply sections 170 and 180, respectively, for further increasing the thermal energy generated in the first reactor 31 of the reformer 30.

Figure 13:
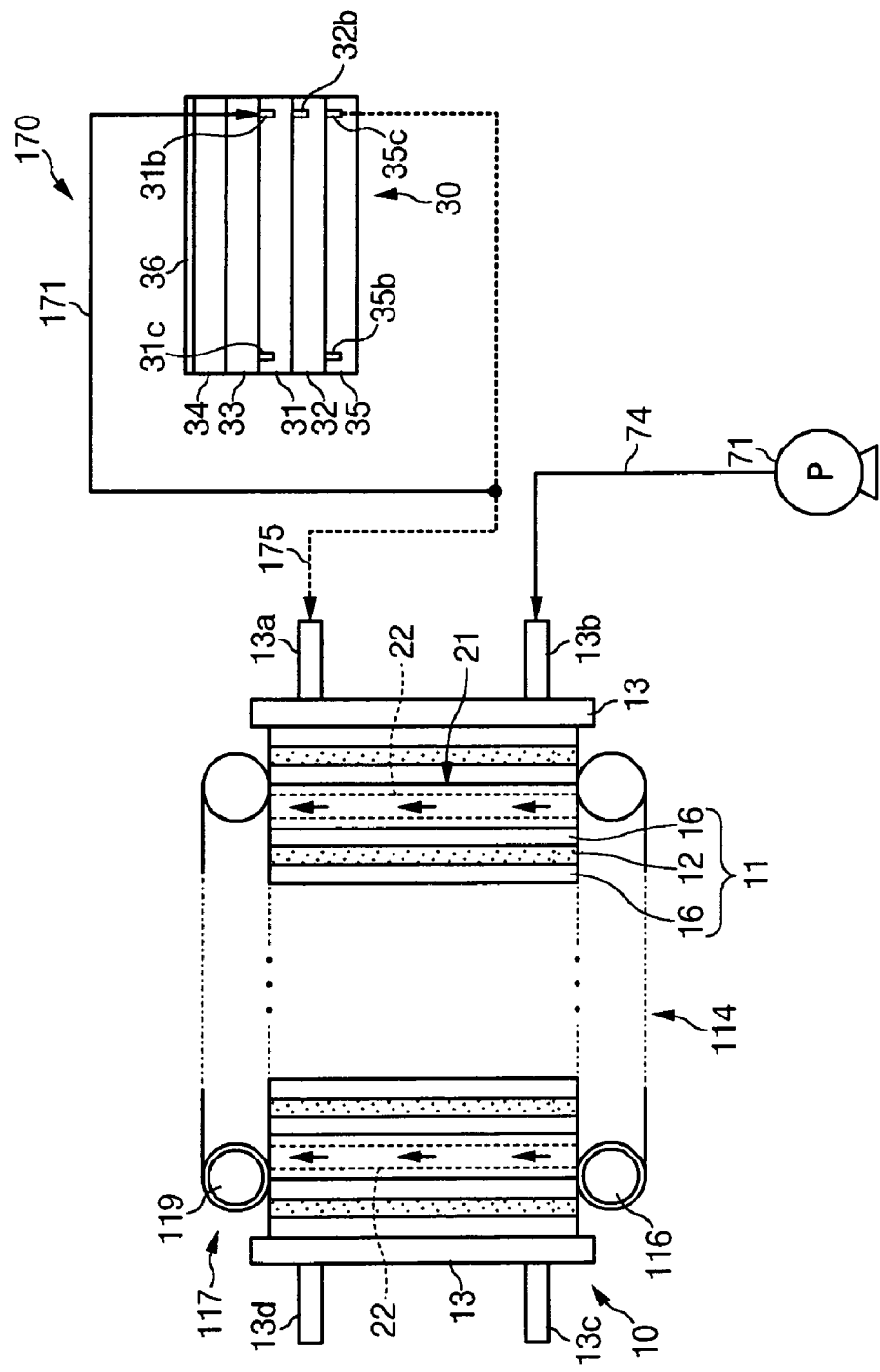
FIG. 13 is a schematic view of a first auxiliary fuel supply assembly of FIG. 1 and related elements.
Figure 14:
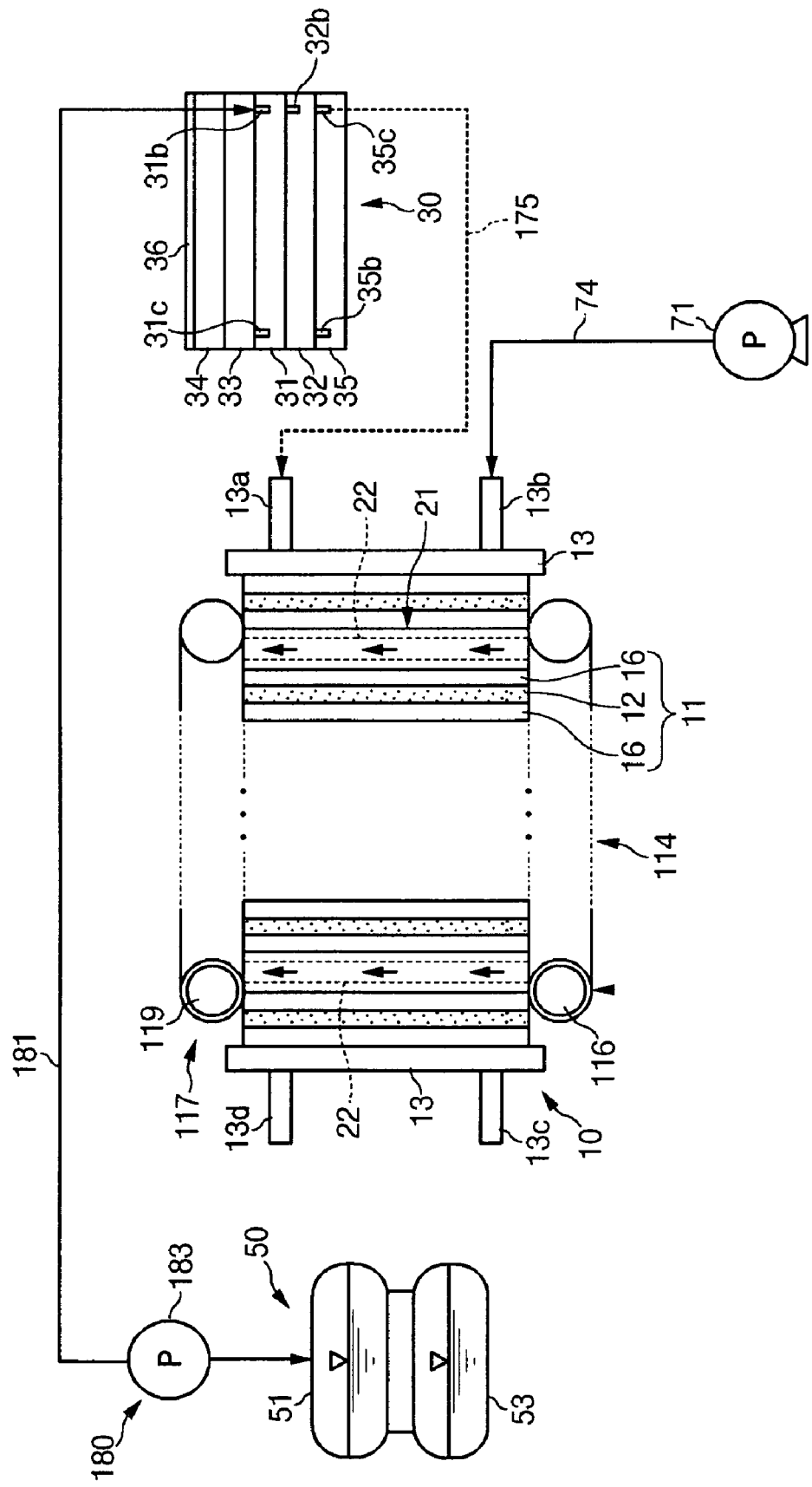
FIG. 14 is a schematic view of a second auxiliary fuel supply assembly of FIG. 1 and related elements.

FIG. 13 is a schematic view of the first auxiliary fuel supply assembly 170 and related elements, and FIG. 14 is a schematic view of the second auxiliary fuel supply assembly 180 and related elements.

Referring first to FIGS. 1 and 13, the first auxiliary fuel supply assembly 170 is structured such that hydrogen gas supplied from the fifth reactor 35 of the reformer 30 to the first infusion member 13a of the stack 10 is again supplied to the first reactor 31.

The first auxiliary fuel supply assembly 170 includes a thirteenth supply line 171 for interconnecting the hydrogen gas supply line 175, which connects the second exhaust hole 35c of the fifth reactor 35 and the first infusion member 13a of the stack 10, and the eleventh supply line 151 of the second circulating section 150.

Referring to FIGS. 1 and 14, the second auxiliary fuel supply assembly 180 is structured such that liquid fuel stored in the first tank 51 of the fuel supply assembly 50 is directly supplied to the first reactor 31.

The second auxiliary fuel supply assembly 180 includes a fourteenth supply line 181 interconnecting the first tank 51 of the fuel supply assembly 50 and the first intake hole 31b of the first reactor 31, and also includes a second pump 183 mounted on the fourteenth supply line 181.

The operation of the fuel cell system 100 according to the exemplary embodiment with the above structure will now be described.

During the initial operation of the fuel cell system 100, the first pump 55 is operated such that the liquid fuel stored in the first tank 51 is supplied to the first reactor 31 through the first supply line 111. At the same time, the air pump 71 is operated such that air is supplied to the first reactor 31 through the second supply line 72. The liquid fuel and the air are supplied to the first flow channel 31a through the first intake hole 31b of the first reactor 31.

Next, the liquid fuel and the air move along the first flow channel 31a of the first reactor 31 to effect a catalytic oxidation reaction. Therefore, reaction heat of a predetermined temperature is generated in the first reactor 31 through such an oxidation reaction. Accordingly, the thermal energy generated in the first reactor 31 is transmitted to the second reactor 32, the third reactor 33, the fourth reactor 34 and the fifth reactor 35 to pre-heat the entire reformer 30.

During this operation, combustion gas generated in the first reactor 31 is emitted through the first exhaust hole 31c. Therefore, the discharge gas is maintained at a relatively high temperature, and is injected into the entrance 116 of the nozzle member 114 through the third supply line 113.

Subsequently, the discharge gas is reflected to the pathways 22 of the pathway assemblies 21 through the nozzle holes 115 of the nozzle member 114. Accordingly, while the discharge gas is passing through the pathways 22, the heat of the discharge gas itself is transmitted to the separators 16 such that the electricity generators 11 are pre-heated.

Next, the discharge gas passing through the pathways 22 is discharged to the exterior of the fuel cell system 100 via the recovery member 117, or is supplied to the first reactor 31 of the reformer 30.

After completion of pre-heating of the reformer 30 and the electricity generators 11 in this manner, the first pump 55 is operated such that the liquid fuel stored in the first tank 51 and the water stored in the second tank 53 are supplied to the second reactor 32 through the fuel supply line 58. The second reactor 32 receives the heat generated in the first reactor 31 so as to be heated to a predetermined temperature.

Following the above operation, the liquid fuel and water mixture is evaporated while flowing through the second flow channel 32a of the second reactor 32 by the heat of the same. The vaporized fuel mixture passes sequentially through the fourth passage hole 32d of the second reactor 32, the second passage hole 31e of the first reactor 31, and the fifth passage hole 33b of the third reactor 33 to thereby flow through the third flow channel 33a of the third reactor 33. As a result, the third reactor 33 generates hydrogen gas from the vaporized fuel mixture through an evaporation reforming catalytic reaction. That is, a decomposition reaction of the mixed fuel and a degeneration reaction of carbon monoxide simultaneously occur in the evaporation reforming catalytic reaction of the third reactor 33 to thereby generate hydrogen gas containing carbon monoxide and hydrogen. During this process, it is difficult for the third reactor 33 to fully effect the degeneration reaction of the carbon monoxide such that hydrogen gas containing a small amount of carbon monoxide as a secondary production material is generated.

Next, the hydrogen gas flows along the fourth flow channel 34a of the fourth reactor 34 through the sixth passage hole 33c of the third reactor 33 and the eighth passage hole 34b of the fourth reactor 34. As a result, the fourth reactor 34 generates additional hydrogen gas by an aqueous gas conversion catalytic reaction, and performs a primary reduction of the concentration of carbon monoxide contained in the hydrogen gas.

Subsequently, the hydrogen gas passed through the fourth flow channel 34a of the fourth reactor 34 flows into the fifth flow channel 35a of the fifth reactor 35 via the ninth passage hole 34c of the fourth reactor 34, the seventh passage hole 33d of the third reactor, the first passage hole 31d of the first reactor 31, and the third passage hole 32c of the second reactor 32.

At the same time, the air pump 71 is operated such that air is injected into the third intake hole 35b of the fifth reactor 35 through the seventh supply line 73. As a result, the fifth reactor 35 performs a secondary reduction of the concentration of carbon monoxide contained in the hydrogen gas through a selective oxidation catalytic reaction.

Next, the hydrogen gas is supplied to the first infusion member 13a of the stack through the gas supply line 175. Simultaneously, the air pump 71 is operated such that air is supplied to the second infusion member 13b of the stack 10 via the fourth supply line 74. Therefore, the hydrogen gas is supplied to the anode electrodes of the MEAs 12 via the air paths of the separators 16. Further, the air is supplied to the cathode electrodes of the MEAs 12 via the air paths of the separators 16.

Accordingly, the hydrogen gas is resolved into electrons and protons (hydrogen ions) by an oxidation reaction at the anode electrodes. Further, the protons move to the cathode electrodes through the electrolyte layers, and since the electrons are unable to pass through the electrolyte layers, they move to the adjacent cathode electrodes of the MEAs 12 through the separators 16. The flow of the electrons during this operation creates a current. Further, water and heat is additionally generated by the reduction reaction of the moved protons, electrons, and hydrogen. The heat generated in the electricity generators 11 is transmitted to the pathway assemblies 21 through the separators 16. During this process, the first pump 55 is operated such that the liquid fuel stored in the first tank 51 and the water stored in the second tank 53 are supplied to the entrance 116 of the nozzle member 114 through the fifth supply line 121.

Next, a mixture of the liquid fuel and the water is supplied to the pathways 22 of the pathway assemblies 21 through the nozzle holes 115 of the nozzle member 114. As a result, the mixed fuel passes through the pathways 22 to reduce the heat created by the electricity generators 11. Next, the mixed fuel passing through the pathways 22 is collected by the recovery member 117. At this time, the mixed fuel cools the electricity generators 11, and is heated to a predetermined temperature.

Subsequently, the pre-heated mixed fuel is supplied to the second reactor 32 through the sixth supply line 123. The mixed fuel is sprayed into the pathway assemblies 21 through the nozzle member 114 by the pumping force generated by the first pump 55, and is collected by the recovery member 117 for supply to the second intake hole 32b of the second reactor 32. Next, the reformer 30 generates hydrogen gas by the above consecutive operations, and supplies the hydrogen gas to the first infusion member 13a of the stack 10.

During generation of electricity by the electricity generators 11, part of the air supplied to the cathode electrodes of the MEAs 12 through the separators 16 is reacted, and the remainder of the air is exhausted through the second discharge member 13d in a state containing high temperature moisture generated by the combination reaction of hydrogen and oxygen.

Next, the moisture containing unreacted air is supplied to the condenser 131 through the eighth supply line 133. As a result, the moisture is converted into water and air by passing through the condenser 131. The water is returned to the second tank 53 through the ninth supply line 141, and the air is returned to the first reactor 31 through the tenth supply line 143.

Further, part of the hydrogen gas supplied to the anode electrodes of the MEAs 12 through the separators 16 during generation of electricity by the electricity generators 11 is reacted, and the remainder hydrogen gas is unreacted and discharged through the first discharge member 13c.

Next, the unreacted hydrogen gas is supplied to the first reactor 31 through the eleventh supply line 151. At this time, part of the unreacted hydrogen gas re-supplied to the first reactor 31 is reacted, and the remainder is discharged through the first exhaust hole 31c of the to first reactor 31 in an unreacted state. As a result, the discharge gas is supplied to the heater 161 through the twelfth supply line 163 so as to be heated. The heated discharge gas is discharged to the exterior of the fuel cell system 100 through the seventh valve 165.

In addition, the hydrogen gas supplied to the first infusion member 13a of the stack 10 from the fifth reactor 35 of the reformer 30 is re-supplied to the first reactor 31 through the thirteenth supply line 171. As a result, the thermal energy operating on the reformer 30 of the fuel cell system 100 is further increased. Also, as another method of increasing the thermal energy operating on the reformer 30, the second pump 183 is operated such that the liquid fuel 18 stored in the first tank 51 is supplied to the first reactor 31 through the fourteenth supply line 181.

Figure 15:
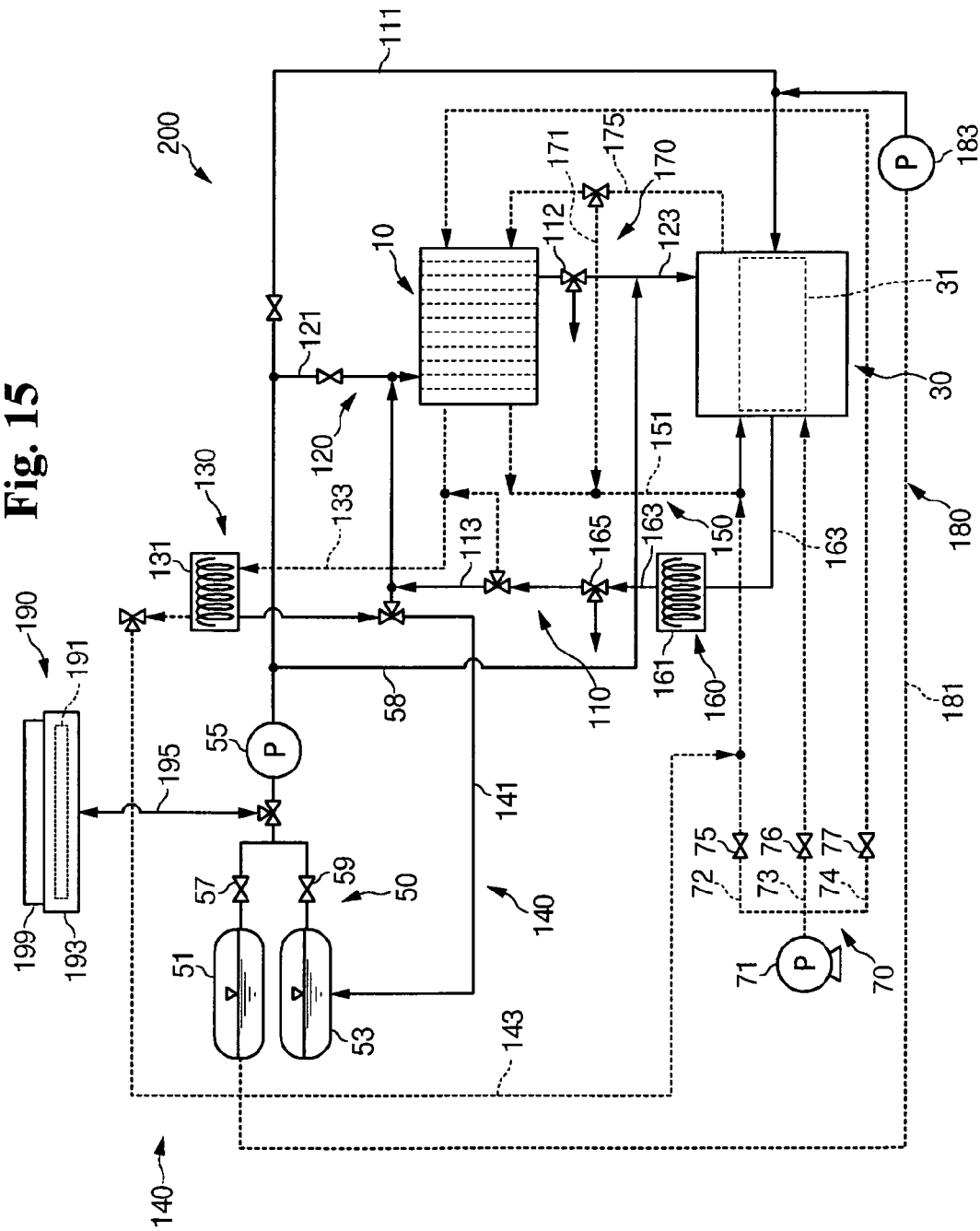
FIG. 15 is a schematic view of a fuel cell system according to another exemplary embodiment of the present invention.

FIG. 15 is a schematic view of a fuel cell system according to another exemplary embodiment of the present invention. The same reference numerals will be used for elements identical to those appearing in FIG. 1.

A fuel cell system 200 according to another exemplary embodiment of the present invention uses the basic configuration of the fuel cell system of FIG. 1, but is configured to reduce the heat generated by a load 199 of an electronic device such as a laptop computer or mobile phone. The load 199 is mounted in an electronic device, and includes a central processing unit (CPU), various circuit elements, etc. that process the electrical energy generated in the fuel cell system 200.

The fuel cell system 200 includes a fifth heat exchanger 190 that circulates liquid fuel, water, and/or a liquid fuel and water mixture (hereinafter referred to simply as "fuel") stored in the first and second tanks 51 and 53 of the fuel supply assembly 50. The fuel is circulated through the load 199 to thereby reduce the heat generated therein. The fuel cell system 200 may utilize a polymer electrode membrane fuel cell (PEMFC) method, in which hydrogen gas is generated through the reformer 30, and this hydrogen gas is supplied to the electricity generators 11 to thereby create electrical energy through electrochemical reaction with oxygen. Alternatively, the fuel cell system 200 may utilize a direct methanol fuel cell (DMFC) method, in which fuel is directly supplied to the electricity generators 11 for generation of electricity. The fuel cell of the DMFC method is such that the reformer 30 may be excluded from the fuel cell system 200, unlike when using the PEMFC method. In the following, it will be assumed that the fuel cell system 200 utilizes the PEMFC method, with the understanding that the present invention is not limited in the method of generating electricity.

The fifth heat exchanger 190 includes a cooling plate 193 which has a pathway 191, and which contacts the load 199. The fuel supply assembly 50 and the pathway 191 are interconnected by a fifteenth supply line 195.

In the fuel cell system 200 of this exemplary embodiment, the fuel stored in the first tank 51 and second tank 53 is supplied to the pathway 191 through the fifteenth supply line 195. The heat generated in the load 199 is transmitted to the cooling plate 193. As a result, the fuel cools the cooling plate 193 while flowing through the pathway 191. Further, the fuel that is heated while cooling the load 199 is supplied to the electricity generators 11 and the reformer 30.

The fuel cell system of the present invention has a structure to enable pre-heating of the reformer and the stack during initial operation of the system such that the thermal efficiency of the entire system is improved.

Further, during normal operation, the fuel required for electricity generation is used to reduce the heat generated by the stack to thereby cool the same, and the pre-heated fuel is supplied to the reformer. As a result, the cooling efficiency of the system is enhanced, loss of thermal energy while cooling the stack is reduced, and pre-heating requirements for operation of the reformer are satisfied using the discharged heat of the stack.

In addition, the unreacted air discharged from the stack is recovered as water and vapor for use as fuel for generating hydrogen gas. Therefore, there is no leakage of water from the stack, the entire thermal efficiency of the system is improved, and the capacity of the fuel tank is reduced such that the entire system is made more compact.

Finally, since the unreacted hydrogen gas discharged from the stack is used as an energy source of the reformer, the thermal efficiency of the entire system is additionally improved.

Although embodiments of the present invention have been described in detail hereinabove in connection with certain exemplary embodiments, it should be understood that the invention is not limited to the disclosed exemplary embodiments, but, on the contrary is intended to cover various modifications and/or equivalent arrangements included within the spirit and scope of the present invention, as defined in the appended claims.

What is claimed is:

1. A fuel cell system, comprising:
   a reformer for generating hydrogen gas from fuel containing hydrogen using a chemical catalytic reaction and thermal energy, the reformer including a reactor that generates thermal energy by an oxidation reaction of the fuel and oxygen;
   at least one electricity generator for generating electrical energy by an electrochemical reaction of the hydrogen gas and oxygen;
   a fuel supply assembly for supplying fuel to the reformer, the fuel supply assembly comprising a tank for storing the fuel, a pump connected to the tank, and a first supply line interconnecting the tank and the reactor;
   an oxygen supply assembly for supplying oxygen to said at least one electricity generator, the oxygen supply assembly comprising an air pump for performing intake of air;
   a second supply line interconnecting the air pump and the reactor of the reformer;
   a cooling member connected to said at least one electricity generator by means of a first transport path for cooling said at least one electricity generator; and
   a heat exchanger connected to the reformer and to said at least one electricity generator for supplying thermal energy of the reformer during initial operation of the system to said at least one electricity generator, whereby to pre-heat said at least one electricity generator;
   wherein the heat exchanger comprises a second transport path for supplying exhaust gas generated from the reformer to said at least one electricity generator, and the first transport path is different from the second transport path.

2. The fuel cell system of claim 1, wherein the reformer includes a reactor that generates thermal energy by an oxidation reaction of the fuel and oxygen;
   said at least one electricity generator comprising a plurality of electricity generators, a stack being formed by mounting the electricity generators in an adjacent configuration; and
   wherein the stack includes pathway assemblies mounted between adjacent electricity generators and having pathways through which the thermal energy passes.

3. The fuel cell system of claim 2, wherein the heat exchanger comprises:
   a nozzle member connected to one end of the pathways so as to interconnect the reactor and the pathways; and
   a recovery member connected to another end of the pathways so as to communicate with the nozzle member.

4. The fuel cell system of claim 3, wherein the second transport path interconnects the reactor and the nozzle member.

5. The fuel cell system of claim 2, wherein the pathway assemblies are high temperature conductive members made of a selected one from the group consisting of aluminum, copper, and steel in the form of a plate.

6. The fuel cell system of claim 2, wherein each of the electricity generators comprises:
   a membrane electrode assembly; and
   separators connected to opposite sides of the membrane electrode assembly;
   wherein the pathway assemblies form the pathways in adjacent separators.

* * * * *